(12) United States Patent
Zhao et al.

(10) Patent No.: US 12,709,259 B2
(45) Date of Patent: Aug. 18, 2026

(54) BRAKE-BY-WIRE SYSTEM INCLUDING PRESSURE BALANCED PSU PISTON WITH WETTED BALL SCREW

(71) Applicant: BWI (Shanghai) Co., Ltd., Shanghai (CN)

(72) Inventors: Xiaoxu Zhao, Shanghai (CN); Pascal Chaumette, Creteil (FR); David Fredrick Reuter, Beavercreek, OH (US); Dongqiang Luo, Shanghai (CN); Daniel Norbert Borgemenke, Springboro, OH (US)

(73) Assignee: BWI (Shanghai) Co., Ltd., Shanghai (CN)

( * ) Notice: Subject to any disclaimer, the term of this patent is extended or adjusted under 35 U.S.C. 154(b) by 827 days.

(21) Appl. No.: 17/967,819

(22) Filed: Oct. 17, 2022

(65) Prior Publication Data

US 2023/0119335 A1 Apr. 20, 2023

Related U.S. Application Data

(60) Provisional application No. 63/257,097, filed on Oct. 18, 2021.

(30) Foreign Application Priority Data

Sep. 29, 2022 (CN) ......................... 202211204184.4

(51) Int. Cl.
*B60T 8/40* (2006.01)
*B60T 7/04* (2006.01)
(Continued)

(52) U.S. Cl.
CPC ............ *B60T 13/745* (2013.01); *B60T 7/042* (2013.01); *B60T 8/4081* (2013.01); *B60T 13/66* (2013.01)

(58) Field of Classification Search
CPC ...... B60T 7/042; B60T 8/4081; B60T 8/4018; B60T 13/66; B60T 13/745
See application file for complete search history.

(56) References Cited

U.S. PATENT DOCUMENTS 6,305,758 B1 10/2001 Hageman et al.
9,446,753 B2 9/2016 Feigel et al.
(Continued)

FOREIGN PATENT DOCUMENTS

CN 107161130 A 9/2017
DE 102013017718 A1 4/2014
(Continued)

OTHER PUBLICATIONS

Yong Jiawang et al., Hardware-in-the-loop test for a braking system of pressure individual regulation, Journal of Jilin University (Engineering and Technology Edition), vol. 46, No. 4, Jul. 2016 (6 Pages).

(Continued)

*Primary Examiner* — Thomas W Irvin
(74) *Attorney, Agent, or Firm* — Dickinson Wright PLLC

(57) ABSTRACT

An electro-hydraulic brake system comprises a single-circuit master cylinder (MC) fluidly coupled to a first MC fluid passageway and configured to supply fluid into the first MC fluid passageway in response to pressing force on a brake pedal coupled thereto. The electro-hydraulic brake system also comprises a pressure supply unit (PSU) assembly including an electric motor coupled to a ball screw actuator, a PSU housing defining a piston bore having a terminal end opposite the electric motor, and a PSU piston disposed within the piston bore and movable by the ball screw actuator through the piston bore and dividing the piston bore into a first chamber and a second chamber, with each of the first chamber and the second chamber containing a hydraulic fluid. The ball screw actuator includes an actuator nut (Continued)

assembly having a plurality of ball bearings each disposed within the piston bore and submerged in the hydraulic fluid.

20 Claims, 14 Drawing Sheets

(51) Int. Cl.
*B60T 13/66* (2006.01)
*B60T 13/74* (2006.01)

(56) References Cited

U.S. PATENT DOCUMENTS

| | | | | |
|---|---|---|---|---|
| 10,150,458 | B2 | 12/2018 | Weh et al. | |
| 10,703,350 | B2 | 7/2020 | Knechtges et al. | |
| 10,906,513 | B2 * | 2/2021 | Feigel | B60T 13/662 |
| 10,940,843 | B2 | 3/2021 | Ganzel | |
| 11,535,227 | B2 * | 12/2022 | Timm | B60T 17/22 |
| 12,208,777 | B2 * | 1/2025 | Borgemenke | B60T 13/745 |
| 12,311,902 | B2 * | 5/2025 | Ganzel | B60T 13/146 |
| 2010/0032597 | A1 * | 2/2010 | Beer | B60T 8/4031 251/129.01 |
| 2012/0198959 | A1 | 8/2012 | Leiber et al. | |
| 2014/0354036 | A1 | 12/2014 | Koo | |
| 2018/0334148 | A1 * | 11/2018 | Feigel | B60T 13/662 |
| 2020/0189542 | A1 | 6/2020 | Lee et al. | |
| 2021/0061240 | A1 * | 3/2021 | Zhang | B60T 13/686 |
| 2021/0070273 | A1 * | 3/2021 | Timm | B60T 17/221 |
| 2021/0155215 | A1 * | 5/2021 | Ganzel | B60T 11/20 |
| 2021/0261109 | A1 * | 8/2021 | Ganzel | B60T 7/042 |
| 2022/0371562 | A1 * | 11/2022 | Borgemenke | B60T 13/146 |
| 2023/0174035 | A1 * | 6/2023 | Chaumette | B60T 13/662 303/10 |

FOREIGN PATENT DOCUMENTS

| | | | |
|---|---|---|---|
| DE | 102016222825 | A1 | 5/2017 |
| EP | 1818235 | A1 | 8/2007 |
| EP | 2569192 | B1 | 10/2017 |
| JP | 60179364 | A | 9/1985 |
| JP | 2003137084 | A | 5/2003 |
| JP | 05065060 | B2 | 10/2012 |
| JP | 2017052318 | A | 3/2017 |
| JP | 2022520392 | A | 3/2022 |
| KR | 1020180087357 | A | 8/2018 |
| KR | 10-2014-0066404 | A | 2/2020 |
| KR | 20200072602 | A | 6/2020 |
| KR | 1020200073332 | A | 6/2020 |
| WO | 2020004527 | A1 | 1/2020 |
| WO | 2020164748 | A1 | 8/2020 |

OTHER PUBLICATIONS

Supplementary search issued on Jun. 26, 2025 for counterpart Chinese patent application No. 202211204184.4, along with machine EN translation.

Extended European Search Report issued on Mar. 6, 2023 for counterpart European patent application No. 22201956.4.

First Office Action issued for corresponding Japanese Patent Application 2022-166667 issued on Nov. 28, 2023 and English Translation.

The First Office Action and search report issued on Mar. 24, 2025 for counterpart Chinese patent application No. 202211204184.4, along with machine EN translation downloaded from EPO (14 pages).

Yu Zhuoping et al., Coordinated Control of Hybrid Braking Based on Integrated-Electro-hydraulic Brake System, Journal of Tongji University(Natural Science), vol. 47 No. 6 (6 pages).

The First Office Action issued on Mar. 27, 2025 for counterpart European patent application No. 22201956.4 (6 pages).

First Office Action issued on May 30, 2024 for counterpart Korean patent application No. 10-2022-0134051, along with the English translation.

* cited by examiner 20
24
25
FLS
32
35
P1,P2/T
34
30
TRAVEL
37
38
36
39
69
68
70
42
43
50
72
62
64
128
48
66
56
54
45
44
52
58
40
46
51
P1,P2/T
74
76
82
78
80a
80b
RR
LR
RF
LF
EPB
22a
22b
22c
22d 42
154
175
164
174

42
152
173
162
172

42
150
171
160
170

42
156
128
176
166
54
50
140

320
11-VALVE
P1,P2/T
51
40
50
45
128
62
64
24
FLS
25
P1,P2/T
35
212
68
39
72
30
38
36
TRAVEL
37
92
VEHICLE
COMMUNICATIONS
CAN-V
AUTO
HOLD
93
ON
OFF
EPB
RR
EPB
22c
LR
EPB
22d
82
78
80a
RR
LR
RF
LF
ECU
CAN-V
90
RF
22a
LF
22b

BRAKE-BY-WIRE SYSTEM INCLUDING PRESSURE BALANCED PSU PISTON WITH WETTED BALL SCREW

This U.S. utility patent application claims the benefit of U.S. Provisional Patent Application No. 63/257,097 filed Oct. 18, 2021, and Chinese Application No. 202211204184.4, filed Sep. 29, 2022, the contents of which are incorporated herein by reference in their entirety.

BACKGROUND OF THE INVENTION

1. Field of the Invention

The present disclosure relates generally to brake systems for vehicles, such as automobiles. More specifically, the present disclosure relates to a brake-by-wire system with a pressure supply unit (PSU) having a pressure-balanced piston.

2. Related Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a “brake-by-wire” technique. To accomplish this, the brake pedal in effect becomes a joy stick, so it must be connected to a travel and/or force sensor in order to send a signal to the system ECU that will interpret this as driver’s intent of a desired vehicle deceleration. In addition, the brake pedal “feel” must be simulated by the appropriate force-travel relationship and must also have the ability to be isolated from directly applying the master cylinder to the wheel brakes.

Brake-by-wire systems typically include a pressure supply unit (PSU) to provide a supply of pressurized fluid for actuating the wheel brakes.

SUMMARY OF THE INVENTION

The present disclosure provides an electro-hydraulic brake system. The electro-hydraulic brake system comprises a single-circuit master cylinder (MC) fluidly coupled to a first MC fluid passageway and configured to supply fluid into the first MC fluid passageway in response to pressing force on a brake pedal coupled thereto. The electro-hydraulic brake system also comprises a pressure supply unit (PSU) assembly including an electric motor coupled to a ball screw actuator, a PSU housing defining a piston bore having a terminal end opposite the electric motor, and a PSU piston disposed within the piston bore and movable by the ball screw actuator through the piston bore and dividing the piston bore into a first chamber and a second chamber, with each of the first chamber and the second chamber containing a hydraulic fluid. The ball screw actuator includes an actuator nut assembly having a plurality of ball bearings each disposed within the piston bore and submerged in the hydraulic fluid.

The present invention also provides a pressure supply unit (PSU) assembly for an electro-hydraulic brake system. The PSU assembly comprises: an electric motor; a ball screw actuator including a spindle coupled to the electric motor and configured to transfer rotary motion to linear motion; a PSU housing coupled to the electric motor and defining a piston bore having a terminal end opposite the electric motor; and a PSU piston disposed within the piston bore and translatable by the ball screw actuator through the piston bore and dividing the piston bore into a first chamber and a second chamber, with each of the first chamber and the second chamber containing a hydraulic fluid. The ball screw actuator includes an actuator nut assembly having a plurality of ball bearings each disposed within the second chamber of the piston bore and submerged in the hydraulic fluid.

BRIEF DESCRIPTION OF THE DRAWINGS

Further details, features and advantages of designs of the invention result from the following description of embodiment examples in reference to the associated drawings.

DESCRIPTION OF THE ENABLING EMBODIMENTS

Figure 1:
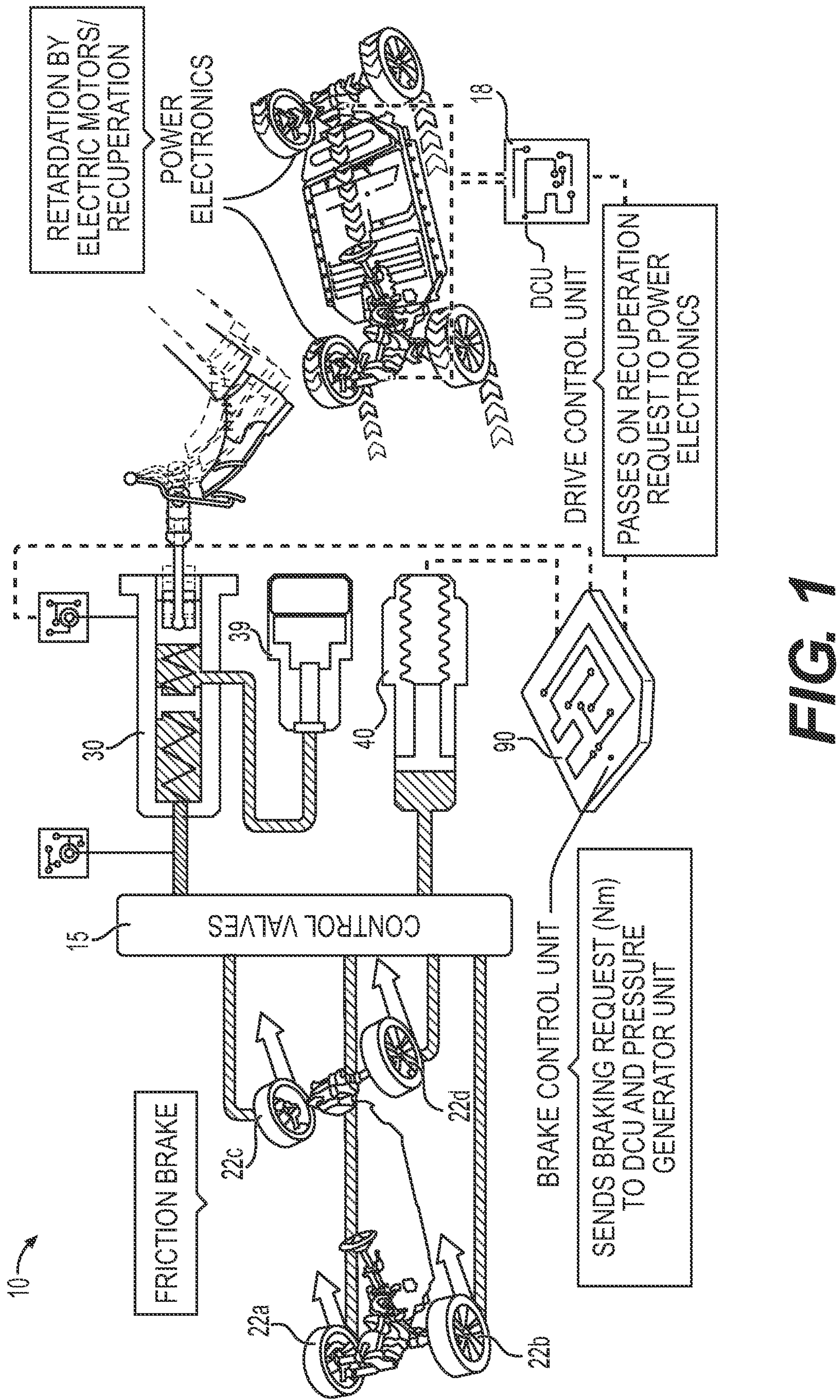
FIG. 1 shows a schematic block diagram of a brake-by-wire system in a vehicle.

Referring to the drawings, the present invention will be described in detail in view of following embodiments.

FIG. 1 shows a schematic block diagram of a brake-by-wire (BbW) system 10 in a vehicle, such as an automobile, and which includes a plurality of wheel brakes 22*a*, 22*b*, 22*c*, 22*d* each having a corresponding actuator, such as a hydraulic cylinder. Basic brake-by-wire (BBW) architecture is now well-established in the automotive industry. The vehicle's master cylinder 30 either directly applies one or more of the wheel brakes 22*a*, 22*b*, 22*c*, 22*d* in a failed system fallback mode or is isolated from the wheel brakes 22*a*, 22*b*, 22*c*, 22*d* and connected to a pedal feel emulator (PFE) 39 that replicates force, travel, and damping of a traditional brake system. The brake pedal travel and/or force, and or brake pressure is used by the system 10 as an input signal to a brake electronic control unit (ECU) 90. It in turn sends the appropriate signal to a pressure supply unit (PSU) assembly 40. The PSU assembly 40 may include a high efficiency brushless motor and ball screw assembly displacing one or more PSU pistons, which can be thought of as an electric master cylinder. The master cylinder 30 and/or the PSU assembly 40 may be coupled to the wheel brakes 22*a*, 22*b*, 22*c*, 22*d* via a series of control valves 15, which may include an apply valve and a release valve (not shown) for each of the wheel brakes 22*a*, 22*b*, 22*c*, 22*d* to provide functions such as antilock braking (ABS), electronic traction control, etc.

The brake pedal inputs define driver intent which determines how fast and how hard the brakes are applied with the goal to replicated the feel of a conventional vacuum booster brake system. The brake ECU 90 may also send a signal to a drive control unit (DCU) 18, which may also be called a powertrain control module (PCM) 18 to slow the vehicle using one or more electric motors in a regenerative mode.

Figure 2:
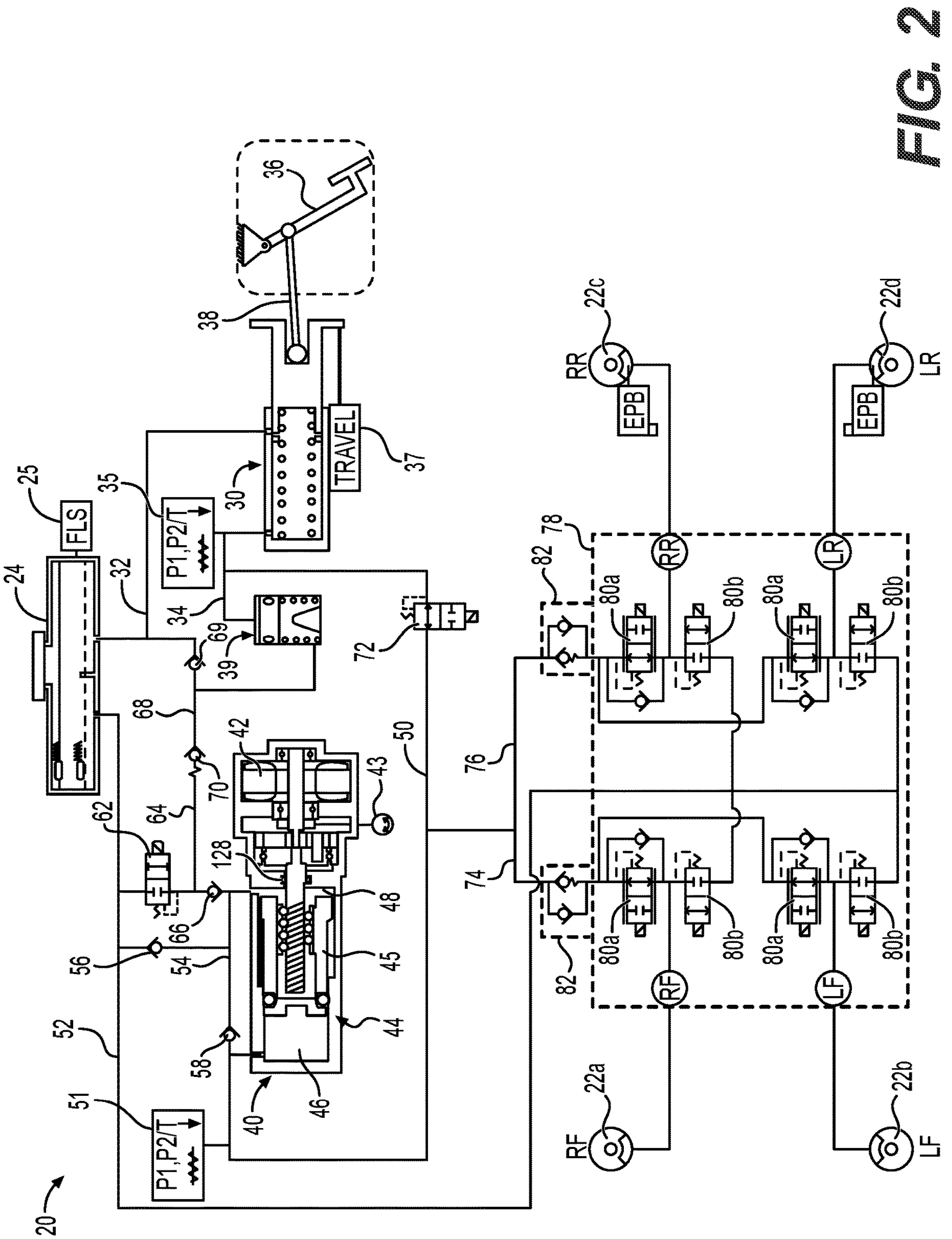
FIG. 2 shows a schematic diagram of a brake-by-wire system of the present disclosure.

FIG. 2 shows a schematic diagram of a BbW system 20 for controlling operation of a plurality of wheel brakes 22*a*, 22*b*, 22*c*, 22*d* in a vehicle. Each of the wheel brakes 22*a*, 22*b*, 22*c*, 22*d* may include a corresponding one of the brake actuators 13. The wheel brakes 22*a*, 22*b*, 22*c*, 22*d* may also be called foundation brakes to distinguish from other braking systems, such as electric regenerative braking.

The BbW system 20 includes a fluid reservoir 24 holding a hydraulic fluid and supplying the hydraulic fluid to a single-circuit master cylinder 30 having a single-circuit configuration, and which may be referred to as a master cylinder (MC) 30. A fluid level sensor 25, such as a float switch, monitors a level of the hydraulic fluid in the fluid reservoir 24. A brake pedal 36 is coupled to press a brake linkage 38 which, in turn, actuates the master cylinder (MC) 30 to pump fluid therethrough from an intake fluid passage 32 and to pressurize a master cylinder (MC) fluid passageway 34. A travel sensor 37 monitors a position of the brake pedal 36. A first pressure sensor 33 monitors the pressure in the MC fluid passageway 34.

A PFE 39 is fluidly coupled to the MC fluid passageway 34 to selectively provide a natural feeling of brake operation, particularly when the master cylinder 30 is decoupled from operating the wheel brakes 22*a*, 22*b*, 22*c*, 22*d*. The PFE 39 includes a PFE piston dividing the PFE 39 into an upper chamber and a lower chamber, and a spring biasing the PFE piston into the upper chamber. The upper chamber of the PFE 39 is fluidly coupled to the MC fluid passageway 34.

A PSU assembly 40 includes an electric motor 42 and a PSU pump 44 to supply the hydraulic fluid from the fluid reservoir 24 to a PSU fluid passageway 50. The PSU assembly 40 may draw fluid from a return fluid passageway 52 that is connected to the fluid reservoir 24 and which is maintained at or near ambient atmospheric pressure. A second pressure sensor 51 monitors the pressure in the PSU fluid passageway 50. A rotor angle sensor 43 may be coupled to the electric motor 42 to determine a position of the rotor in the motor, and thus a position of the PSU pump 44. The PSU pump 44 includes a PSU piston 45 that separates a first chamber 46 from a second chamber 48. The PSU pump 44 includes the electric motor 42 coupled to a ball screw actuator 118, which converts rotary motion to linear motion for moving the PSU piston 45.

The first chamber 46 of the PSU assembly 40 is directly connected to the PSU fluid passageway 50. In response to the PSU piston 45 moving away from the electric motor 42, fluid is pressed out of the first chamber 46 and into the PSU fluid passageway 50. The second chamber 48 of the PSU assembly 40 is directly connected to a replenishing fluid passageway 54. A first check valve 56 allows fluid flow from the return fluid passageway 52 into the replenishing fluid passageway 54, while blocking fluid flow in an opposite direction. A second check valve 58, which may also be called a PSU replenish check valve (PRCV), allows fluid flow from the replenishing fluid passageway 54 into the PSU fluid passageway 50 while blocking fluid flow in an opposite direction.

A PSU reservoir isolation valve (PRIV) 62, which may be a normally-closed solenoid valve, selectively controls fluid flow between the return fluid passageway 52 and an intermediate fluid passageway 64. A third check valve 66 is connected between the intermediate fluid passageway 64 and the replenishing fluid passageway 54 and is configured to allow fluid flow from the replenishing fluid passageway 54 to flow into the intermediate fluid passageway 64 while blocking fluid flow in an opposite direction.

A displacement fluid passageway 68 is connected to the lower chamber of the PFE 39 for transmitting fluid therefrom in response to the PFE piston moving from application of the brake pedal 36. A fourth check valve 69 is connected between the displacement fluid passageway 68 and the intake fluid passage 32 and is configured to allow fluid flow from the intake fluid passage 32 to flow into the displacement fluid passageway 68 while blocking fluid flow in an opposite direction. A fifth check valve 70 is connected between the displacement fluid passageway 68 and intermediate fluid passageway 64 and is configured to allow fluid flow from the displacement fluid passageway 68 to flow into the intermediate fluid passageway 64 while blocking fluid flow in an opposite direction.

A master cylinder isolation valve (MCIV) 72 which may be a normally-open solenoid valve, selectively controls fluid flow between the MC fluid passageway 34 and the PSU fluid passageway 50. The PSU fluid passageway 50 splits fluid supply into a first brake circuit 74 and a second brake circuit 76.

A control valve manifold 78 fluidly connects the two brake circuits 74, 76 to the corresponding wheel brakes 22*a*, 22*b*, 22*c*, 22*d*. The control valve manifold 78 includes an apply valve 80*a* and a release valve 80*b* corresponding to each of the wheel brakes 22*a*, 22*b*, 22*c*, 22*d* to selectively control fluid flow between the corresponding one of the of the wheel brakes 22*a*, 22*b*, 22*c*, 22*d* and an associated one of the two brake circuits 74, 76. The apply valves 80*a* and the release valves 68*b* may collectively be called antilock brake system (ABS) valves for their use in such an ABS. However, the apply valves 80*a* and the release valves 80*b* may be used for other functions, such as for traction control and/or for torque vectoring.

In some embodiments, and as shown in FIG. 2, a bi-directional check valve 82 is disposed in each of the two brake circuits 74, 76 between the PSU fluid passageway 50 and the control valve manifold 78. The bi-directional check valve 82 may allow fluid flow in either direction, but only when a differential pressure thereacross is above some threshold value. The bi-directional check valve 82 may limit an amount of fluid lost in case of a leak in the system, such as a leak in a brake line supplying any of the wheel brakes 22*a*, 22*b*, 22*c*, 22*d*.

When the driver applies the brakes the MCIV 72 is closed, and the PRIV 62 is opened. Fluid from the master cylinder 30 is directed to the PFE 39 to simulate normal brake pedal force and travel. That same travel information may be sent to an electronic control unit (ECU) 90, which subsequently applies the appropriate current to the PSU motor 42 to rotate the ball screw and mechanically displace the PSU piston 45. This causes the fluid to travel through the dual check valves 82, through the ABS apply valves 80*a*, and finally reaching the wheel brakes 22*a*, 22*b*, 22*c*, 22*d* to apply pressure and slow the vehicle.

Figure 3:
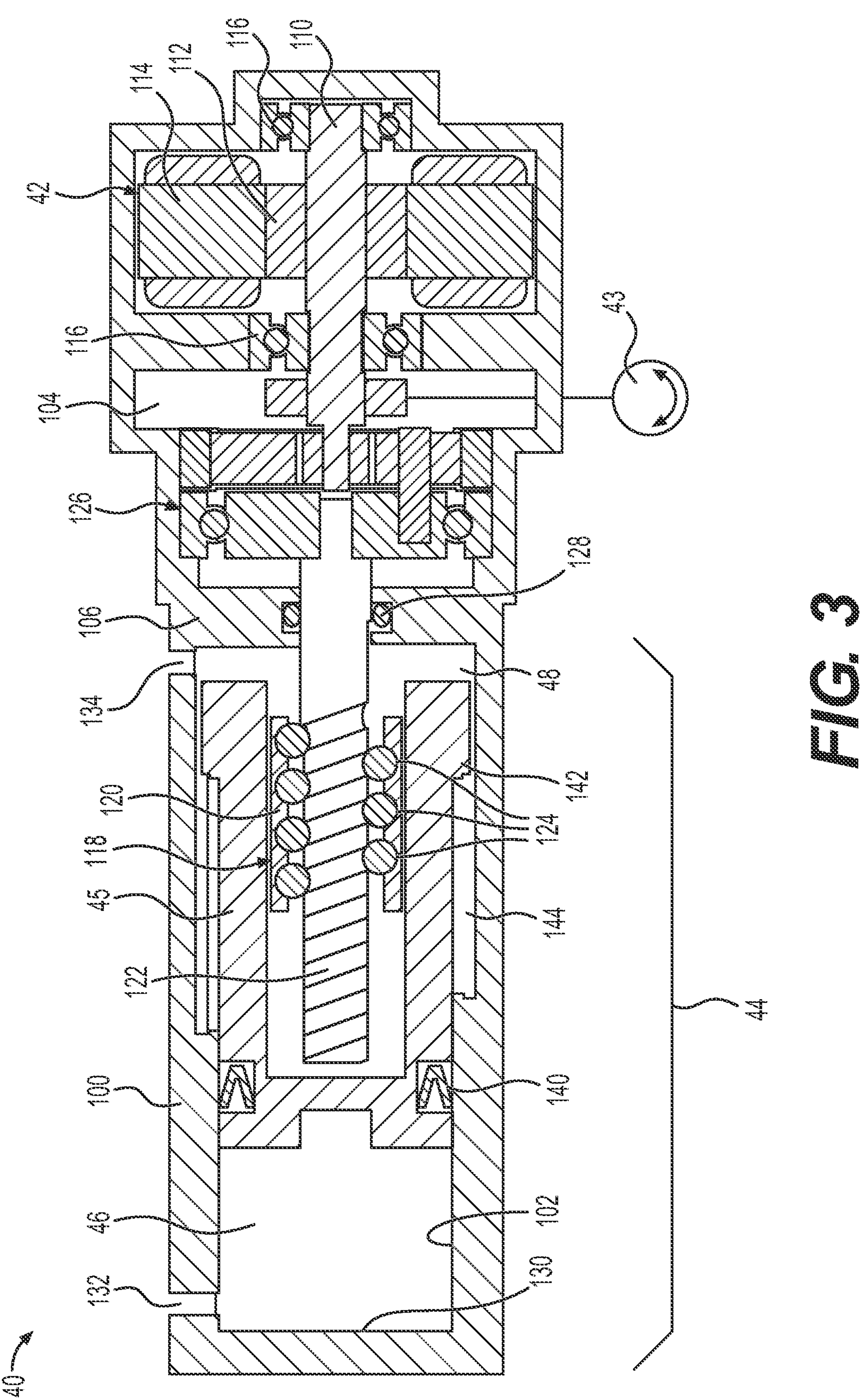
FIG. 3 shows a cut-away diagram of a pressure supply unit (PSU), in accordance with an aspect of the present disclosure.

FIG. 3 shows a cut-away diagram of the PSU assembly 40 of the present disclosure. The PSU assembly 40 includes the electric motor 42 configured to operate the PSU pump 44 to discharge brake fluid to the PSU fluid passageway 50.

The PSU assembly 40 includes a PSU housing 100 defining a piston bore 102. The PSU housing 100 also defines a rear chamber 104, which contains the electric motor 42. A partition 106 separates the piston bore 102 from the rear chamber 104. The partition 106 allows the rear chamber 104 to be maintained dry, while the piston bore 102 contains brake fluid. The electric motor 42 includes a motor shaft 110 coupled to a rotor 112, which is acted upon by electrical current in a stator 114. Shaft bearings 116 may support the motor shaft 110 on either side of the rotor 112.

The PSU pump 44 includes the PSU piston 45 that is pushed and/or pulled by the ball screw actuator 118, which converts rotary motion to linear motion for moving the PSU piston 45. The ball screw actuator 118 includes a spindle 122 and an actuator nut assembly 120, 124. The actuator nut assembly 120, 124 includes a nut 120 and a plurality of ball bearings 124 disposed between the spindle 122 and the actuator nut 120. The actuator nut 120 is attached to the PSU piston 45. The electric motor 42 is configured to rotate the spindle 122, which is threaded and configured to move the actuator nut 120 in a linear path, thereby causing the PSU piston 45 to translate through the piston bore 102 in either of two directions, toward or away from the electric motor 42. The ball screw actuator, therefore, causes the PSU piston 45 to be translated linearly through the piston bore 102 in response to the electric motor 42 rotating the spindle 122. The actuator nut 120 and the plurality of ball bearings 124 are each disposed within the piston bore 102 and submerged in hydraulic fluid.

In some embodiments, and as shown in FIG. 3, the PSU piston 45 has a cup shape, and the actuator nut 120 and the plurality of ball bearings 124 are each disposed within the cup shape of the PSU piston.

In some embodiments, and as shown in FIG. 3, the actuator nut 120 and the plurality of ball bearings 124 are each disposed within the second chamber 48. However, the PSU assembly 40 may have a different configuration, for example with the actuator nut 120 and the plurality of ball bearings 124 being located in the first chamber 46.

In some embodiments, one or more ball bearings 124 may be disposed between the spindle 122 and the actuator nut 120, providing a ball-screw interface. A gear set 126, which may include one or more planetary reduction gears, mechanically couples the motor shaft 110 of the electric motor 42 and the spindle 122, reducing the speed and increasing torque applied to the spindle 122. The gear set 126 is driven by the electric motor 42 and is configured to drive the spindle 122 at a speed that is slower than a speed of the motor shaft 110 of electric motor 42.

A ring seal 128 is disposed between the spindle 122 and the partition 106, providing a fluid-tight seal between the piston bore 102 from the rear chamber 104, while allowing the spindle 122 to rotate. The ring seal 128 may include a lip seal. However, many types of seals may be used. Note that this enables fluid to be trapped on the back side of PSU piston 45 to have the back side of piston seal 140 to be exposed to brake pressure from replenishing fluid passageway 54 and counterbalance the brake pressure exposed to the front side of piston seal 140 from PSU passageway 50, thus creating pressure balance.

The PSU piston 45 is disposed within the piston bore 102 and configured to move linearly therethrough in response to being pushed and/or pulled by the actuator nut 120. The piston bore 102 extends between the partition 106 and a terminal end 130. The piston bore 102 defines the first chamber 46, which extends from the PSU piston 45 to the terminal end 130. The piston bore 102 also defines the second chamber 48, which extends from the partition 106 to the PSU piston 45. A first PSU port 132 provides fluid communication between the first chamber 46 and external fluid circuits. The first PSU port 132 may be fluidly coupled to the PSU fluid passageway 50 for supplying the fluid thereto. A second PSU port 134 provides fluid communication between the second chamber 48 and external fluid circuits. The second PSU port 134 may be fluidly coupled to the replenishing fluid passageway 54 for conveying fluid between the second chamber 48 and the replenishing fluid passageway 54.

In some embodiments, and as shown in FIG. 3, the PSU piston 45 includes a piston seal 140, such as a lip seal that prevents fluid from leaking by the PSU piston 45 between the first chamber 46 and the second chamber 48. In some embodiments, and as also shown in FIG. 3, the PSU piston 45 includes a first anti-rotation structure 142, such as one or more protrusions that engage corresponding second anti-rotation structures 144 in the piston bore 102. For example, the second anti-rotation structure 144 may include one or more linear troughs or keyways configured to receive the corresponding first anti-rotation structure 142. Together, the anti-rotation structures 142, 144 may prevent the PSU piston 45 from rotating, while allowing the PSU piston 45 to translate linearly through the piston bore 102.

Figure 4:
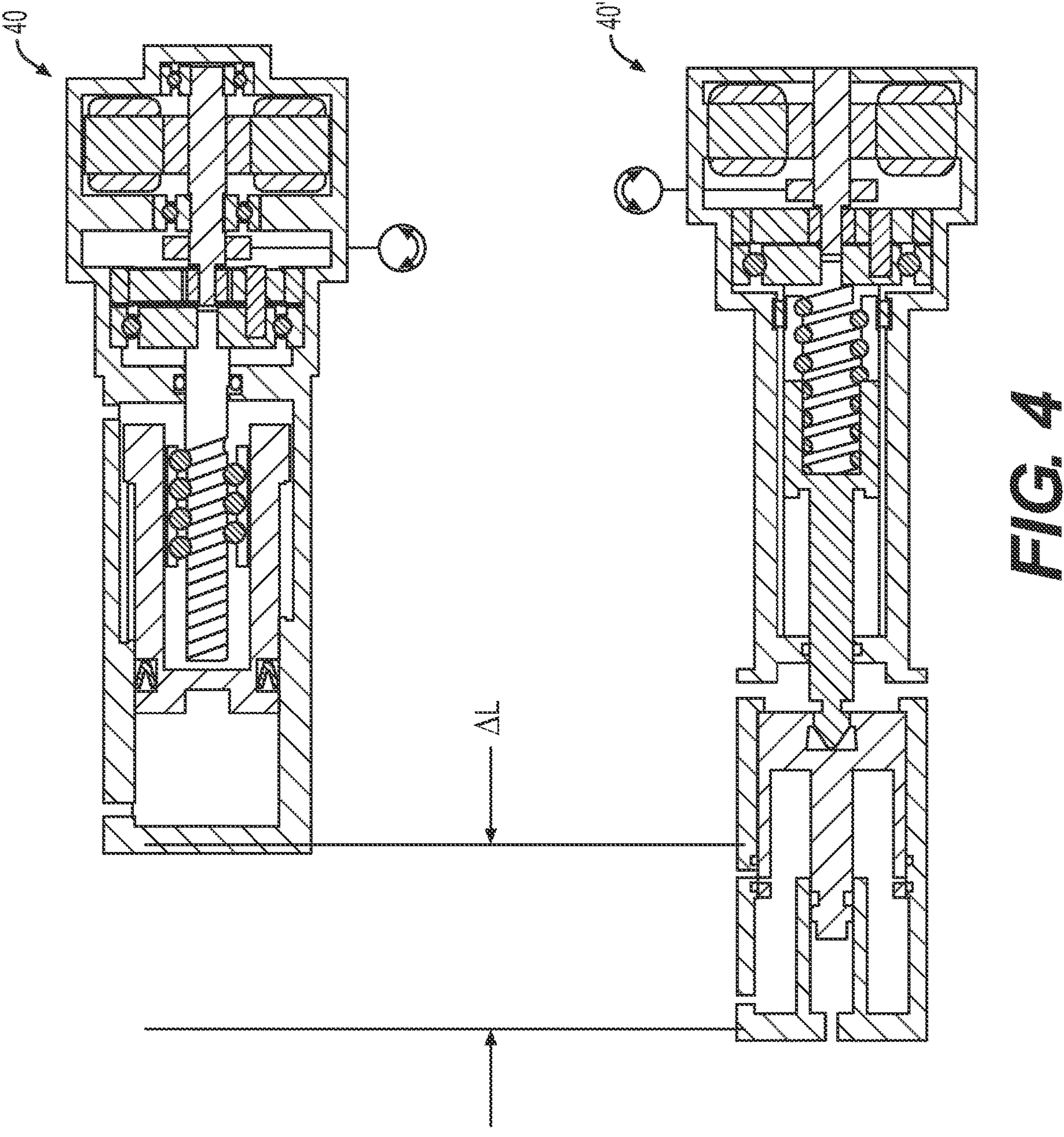
FIG. 4 shows a cut-away diagram of the PSU of the present disclosure with an alternative PSU for size reference.

According to an aspect of the disclosure, the PSU assembly 40 includes the second chamber 48 being sealed using the spindle of the ball screw. This causes three significant design changes over other designs that use an actuator rod to move the PSU piston 45. The first is that the overall length of the PSU assembly 40 is significantly reduced to nearly the same length as the standard drive system (i.e. a PSU 16 with fluid on only one side of the piston). The second is that this now bathes the ball screw in brake fluid. And the third is that is eliminates any need for area equalization on the PSU piston 45, since there is no actuator rod to cause an area imbalance. FIG. 4 shows a cut-away diagram of the PSU assembly 40 of the present disclosure with an alternative PSU that includes an actuator rod to move the PSU piston 45, for size reference.

Figures 5A, 5B, 5C:
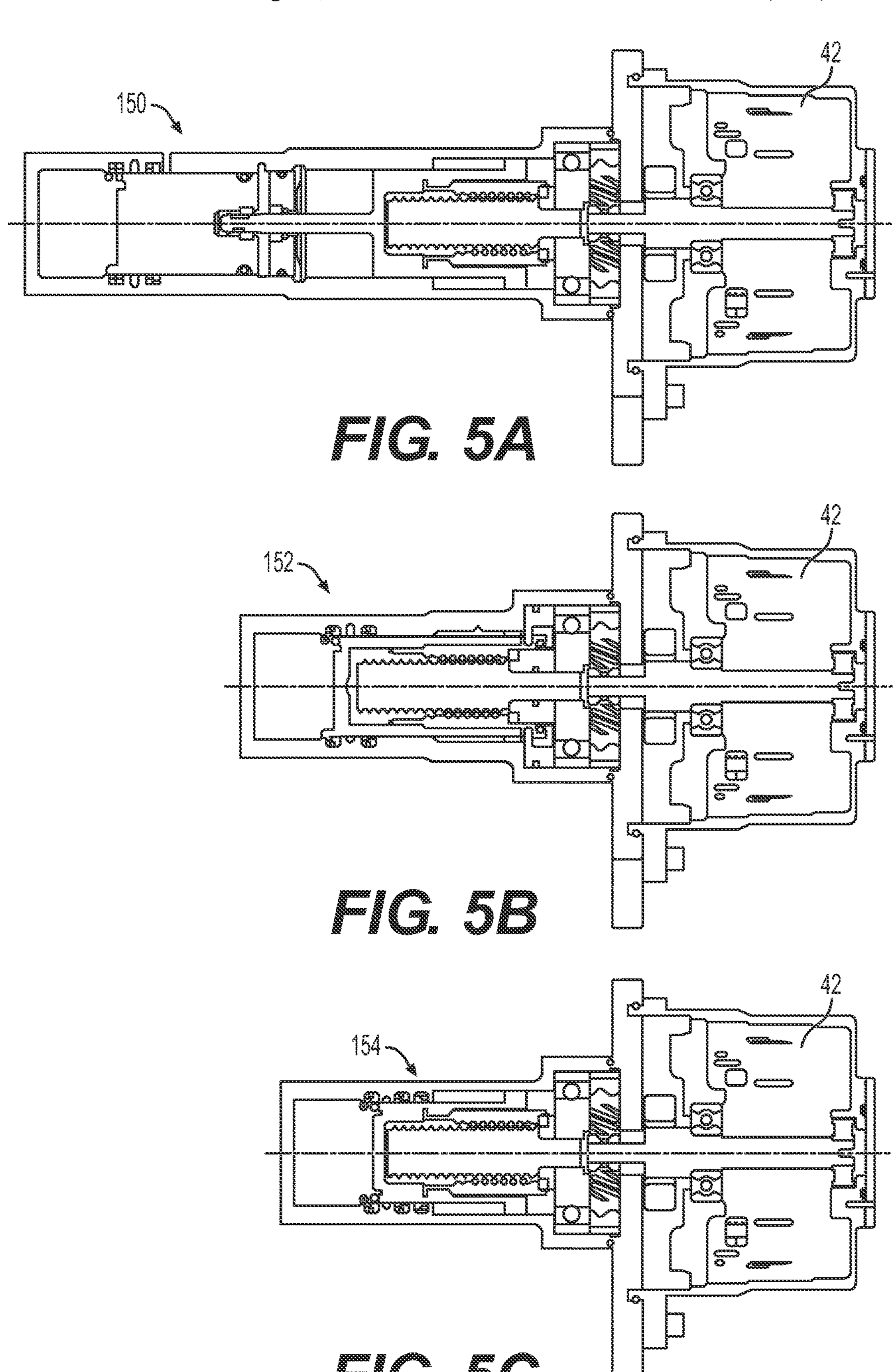
FIGS. 5A-5C show cut-away diagrams of three different PSUs, in accordance with an aspect of the present disclosure.

FIGS. 5A-5C show cut-away diagrams of three different PSUs. FIG. 5A shows a first PSU assembly 150 with a double-acting configuration includes a pressure-balanced design with fluid on both sides of the piston, and with an actuator rod coupling a ball screw type linear actuator to the piston. FIG. 5B shows a second PSU assembly 152 in accordance with the present disclosure. The second PSU assembly 152 may be similar or identical to the PSU assembly 40 of the present disclosure, but with a lip seal in place of the ring seal 128. FIG. 5C shows a third PSU assembly 154 having a conventional design, with fluid on only one side of the piston.

Figures 6A, 6B, 6C:
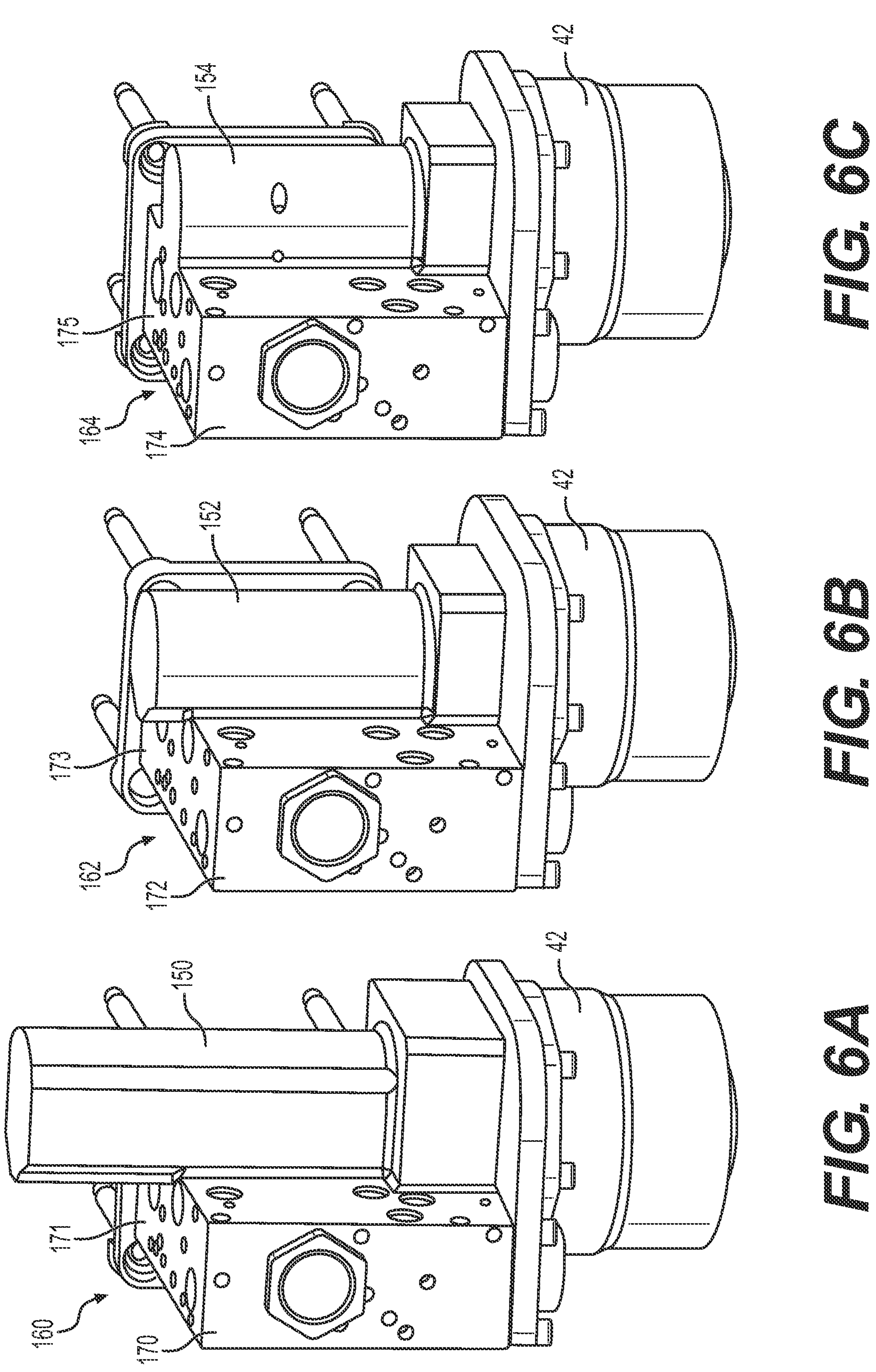
FIGS. 6A-6C each show a perspective views of a one-box brake-by-wire device, each including a corresponding one of the three different PSUs shown in FIGS. 5A-5C.

FIG. 6A shows a first one-box brake-by-wire device 160 that includes the first PSU assembly 150 of FIG. 5A. The first one-box brake-by-wire device 160 includes a first hydraulic control unit (HCU) body 170 having a first top surface 171 opposite from the electric motor 42, with the first PSU assembly 150 extending along a side face of the first HCU body 170 and substantially beyond and above the first top surface 171. FIG. 6B shows a second one-box brake-by-wire device 162 that includes the second PSU assembly 152 of FIG. 5B. The second one-box brake-by-wire device 162 includes a second hydraulic control unit (HCU) body 172 having a second top surface 173 opposite from the electric motor 42, with the second PSU assembly 152 extending along a side face of the second HCU body 172 and protruding slightly beyond and above the second top surface 173, but to a lesser extent than the first PSU assembly 150 extends above the first top surface 171 of the first PSU assembly 150. FIG. 6C shows a third one-box brake-by-wire device 164 that includes the third PSU assembly 154 of FIG. 5C. The third one-box brake-by-wire device 164 includes a third HCU body 174 having a third top surface 175 opposite from the electric motor 42, with the third PSU assembly 154 extending along a side face of the third HCU body 174 ending flush with the third top surface 175. The difference between the PSUs shown on FIGS. 5A and 5B show an example of the size and mass savings that may result from the elimination of the separate actuator, and providing the ball screw to be flooded with brake fluid instead of being dry.

Figure 7:
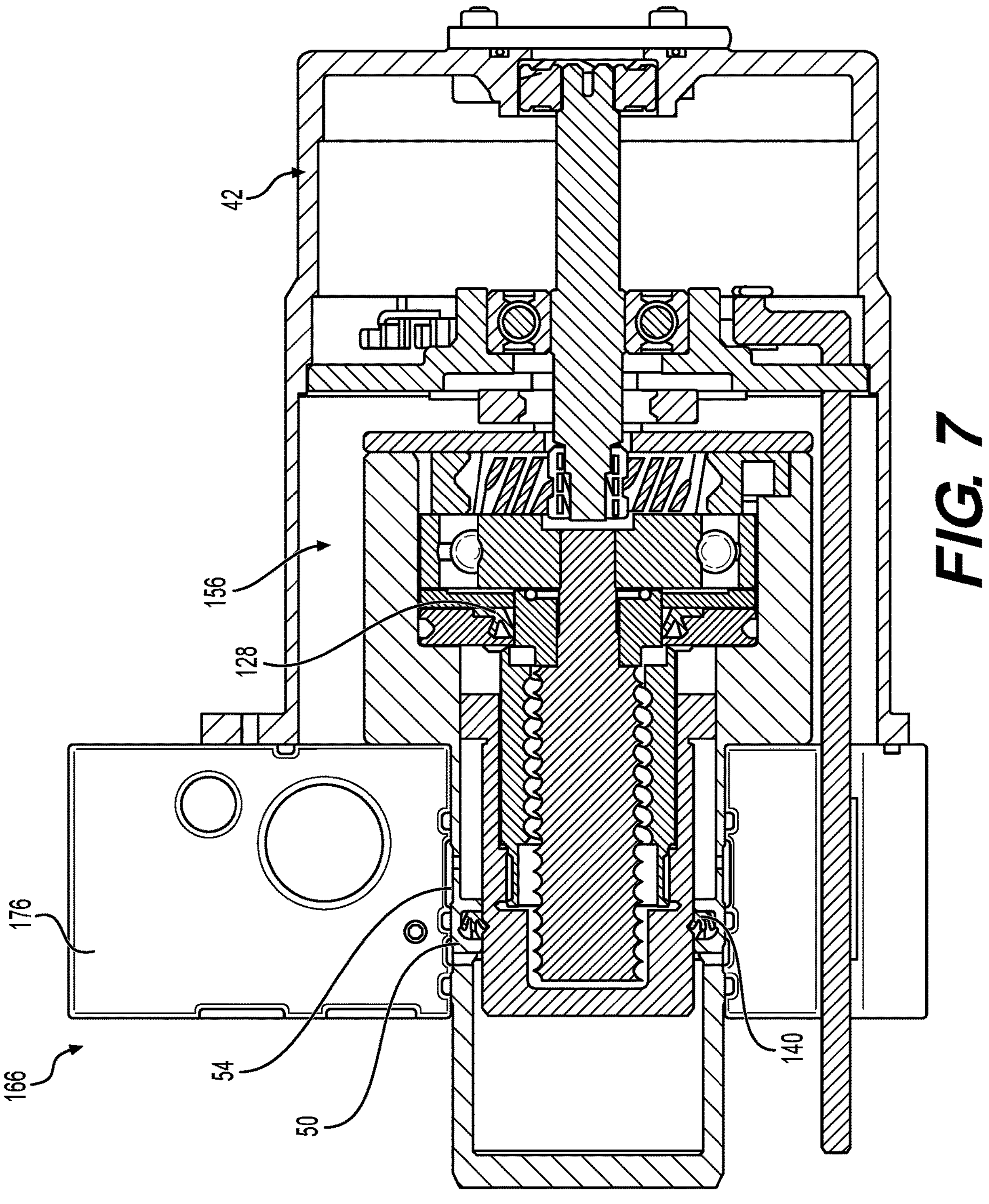
FIG. 7 shows a cross-sectional view of a one-box brake-by-wire device including the PSU of the present disclosure in a transverse motor configuration.

FIG. 7 shows a cross-sectional view of a fourth one-box brake-by-wire device 166. It still maintains a pressure balanced PSU piston 45. The back side of piston seal 140 is exposed to brake pressure from replenishing fluid passageway 54 while the front side of piston seal 140 is exposed to pressure from PSU passageway 50 enabling pressure balance. This fourth PSU assembly 156 is shown in a transverse motor configuration, with the motor 42 oriented such that the motor shaft is horizontal and transverse to a master cylinder bore (not shown) in a fourth HCU body 176. The fourth PSU assembly 156 may have a similar or identical configuration to the second PSU assembly 152 of FIG. 5B. The fourth one-box brake-by-wire device 166 having a transverse motor configuration may provide for a space savings and eliminate costly motor-to-ECU connectors. This design may include a standard brushless motor driving a planetary geartrain to minimize overall cost, maximize motor efficiency, and minimize motor current draw. Reduced motor current draw can provide for an additional cost savings in electronics for powering the motor. This unique combination of designs: pressure balanced PSU piston with rotary lip seal on spindle and transverse motor layout with integrated planetary gearset make this a truly unique design combination.

Figure 8:
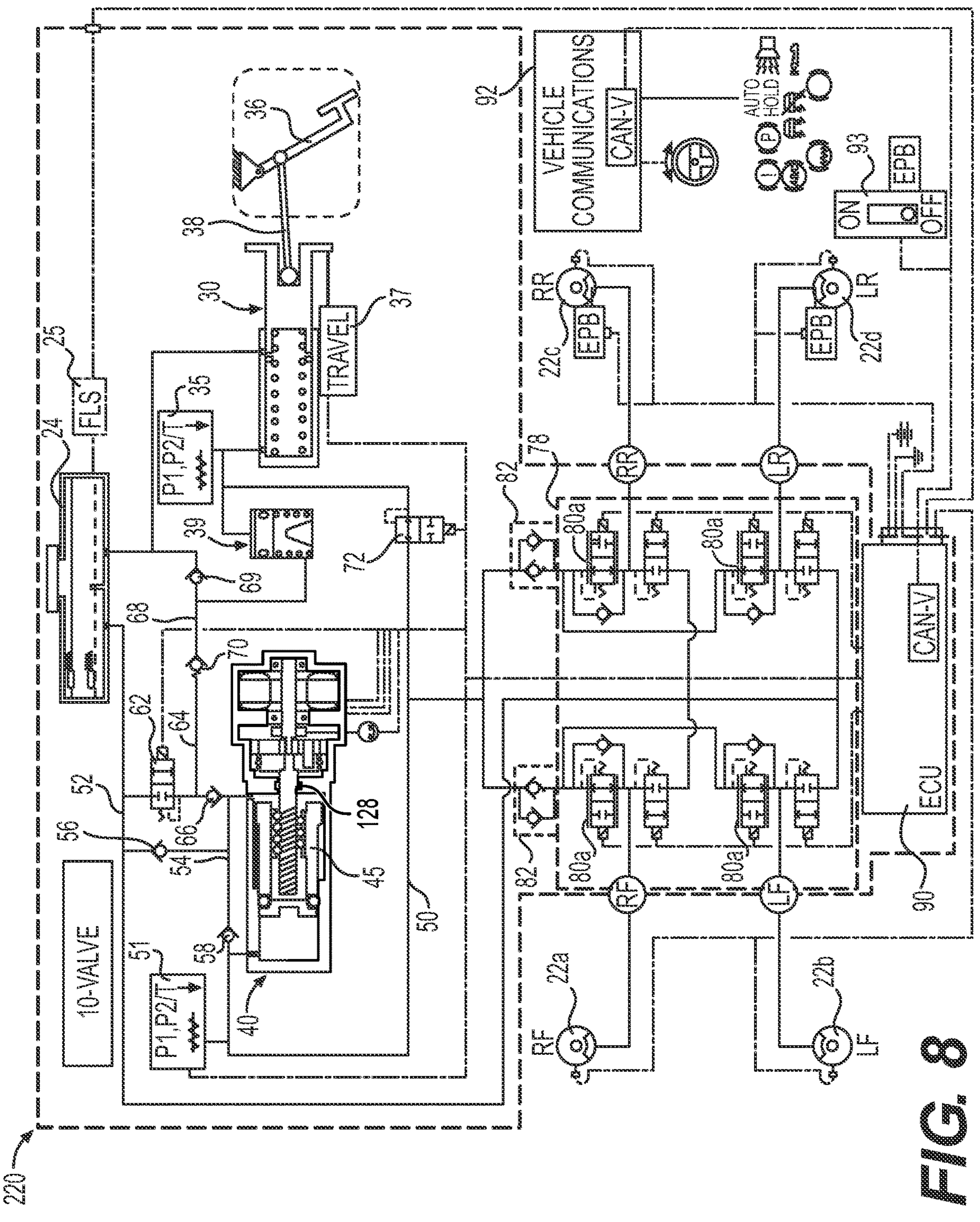
FIG. 8 shows a schematic diagram of the 10-valve brake-by-wire system of FIG. 2, with additional features, in accordance with an aspect of the present disclosure.

FIG. 8 shows a schematic diagram of the 10-valve brake-by-wire system of FIG. 2, with additional features, in accordance with an aspect of the present disclosure. FIG. 8 includes a one-box, 10-valve BbW device 220, as an integrated assembly. The 10-valve system is so-named because of its inclusion of ten actuated valves including the PRIV 62, the MCIV 72, plus the eight solenoid valves in the control valve manifold 78. FIG. 8 also shows the 10-valve BbW device 220 that includes an electronic control unit (ECU) 90, with electrical connections for monitoring the various sensors and for controlling the various actuators, such as the electric motor 42 of the PSU assembly 40, and the solenoid valves. The ECU 90 is also connected to one or more external controllers 92 of a vehicle via a communications network, such as Controller Area Network (CAN bus). The ECU 90 is also configured to control actuation and/or other functions of one or more electric parking brake actuators EPB. The ECU 90 is also configured to receive a parking brake command from a parking brake switch 93 via the communications network. Alternatively or additionally, the parking brake switch 93 may be hardwired to the ECU 90.

The 10-valve design shown in FIG. 8 includes the PSU assembly 40 and the master cylinder 30. When in brake-by-wire mode and the driver applies the brake pedal, the MCIV 72 is closed, and the PRIV 62 is opened. Fluid is directed from the master cylinder 30 to the PFE 39 to simulate normal brake pedal force and travel. That same travel information is sent to the ECU 90 which subsequently applies the appropriate current to the PSU motor to rotate the ball screw and mechanically displace the PSU piston 45. This causes the fluid to travel through the dual check valves 82, through the ABS apply valves 80*a*, and finally reaching the wheel brakes to apply pressure and slow the vehicle.

Since this is an "open" system, meaning the fluid released from the wheel brakes in an ABS stop is not captured but flows back to the reservoir at atmospheric pressure, it is necessary to replenish the PSU. This is accomplished by first closing the PRIV 62 which traps pressure behind the PSU piston 45. The ball screw and PSU piston 45 are retracted. This forces fluid behind the PSU piston 45 to flow to the front of the PSU piston 45 via the second check valve 58. Pressure on both sides of the PSU piston 45 is maintained during replenishment since both sides of the PSU piston 45 displace equal volumes as the PSU piston 45 travels.

Figure 9:
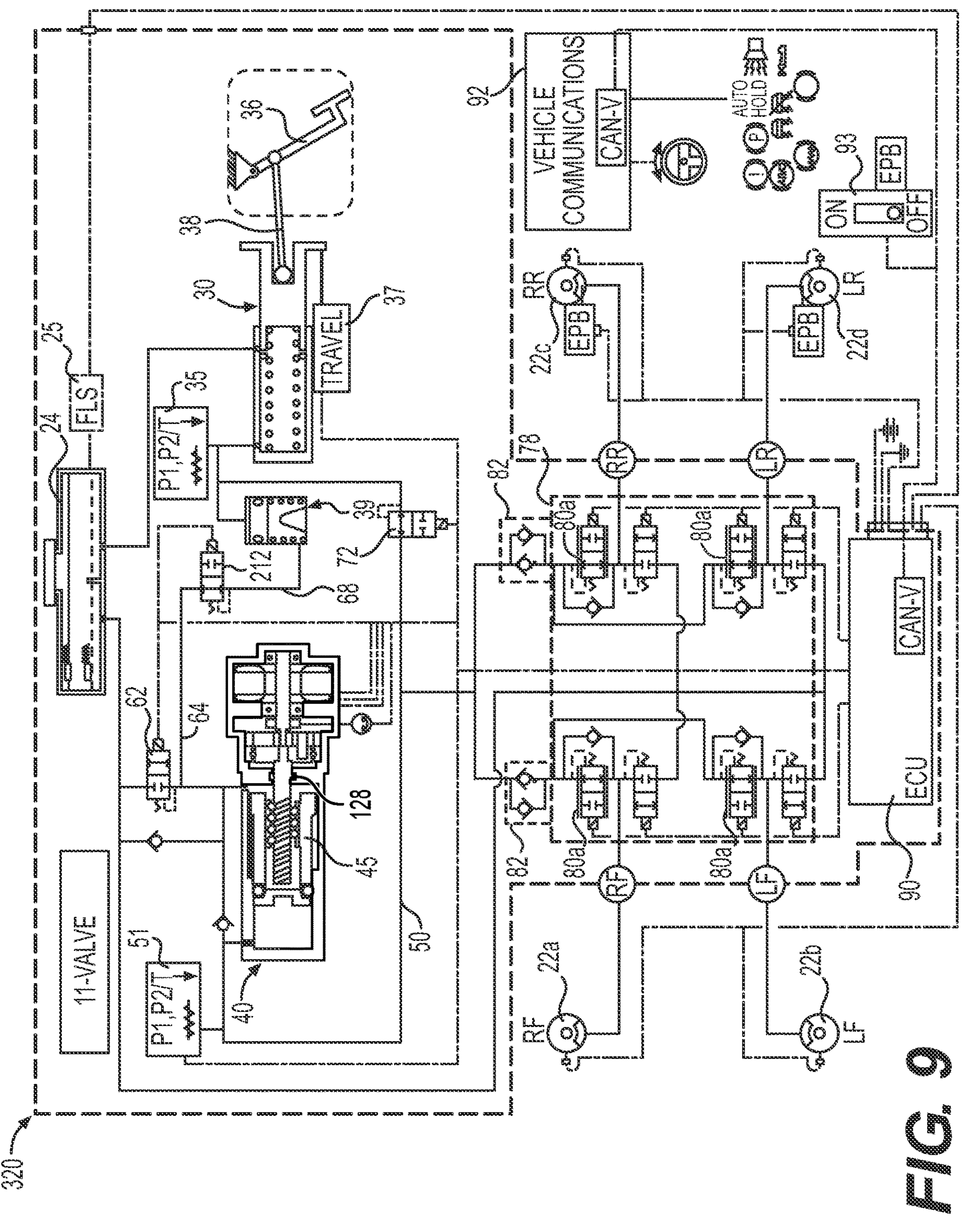
FIG. 9 shows a schematic diagram of a 11-valve brake-by-wire system, in accordance with an aspect of the present disclosure.

FIG. 9 shows a schematic diagram of a 11-valve brake-by-wire system, in accordance with an aspect of the present disclosure. The 11-valve brake-by-wire system may be similar or identical to the 10-valve system of FIG. 8, with a few changes discussed herein. The 11-valve brake-by-wire system includes a PFE isolation valve (PFIV) 212, which may be a normally-open solenoid valve, selectively coupling the intermediate fluid passageway 64 and the displacement fluid passageway 68. The 11-valve brake-by-wire system also does not include several check valves present in the 10-valve system of FIG. 8, such as the third check valve 66, the fourth check valve 69, and the fifth check valve 70.

FIG. 9 includes a one-box, 11-valve BbW device 320, as an integrated assembly. The 11-valve system is so-named because of its inclusion of eleven actuated valves including the PRIV 62, the MCIV 72, the PFIV 212, plus the eight solenoid valves in the control valve manifold 78.

The 11-valve design shown in FIG. 9 includes the PSU assembly 40 and the master cylinder 30. When in brake-by-wire mode and the driver applies the brake pedal, the MCIV 72 is closed, and the PRIV 62 is opened. Fluid from the master cylinder 30 is directed to the PFE 39 to simulate normal brake pedal force and travel. That same travel information is sent to the ECU 90, which subsequently applies the appropriate current to the PSU motor 42 to rotate the ball screw and mechanically displace the PSU piston 45. This causes the fluid to travel through the dual check valves 82, through the ABS apply valves 80*a*, and finally reaching the wheel brakes to apply pressure and slow the vehicle.

Since this is an "open" system, meaning the fluid released from the wheel brakes in an ABS stop is not captured but flows back to the reservoir at atmospheric pressure, it is necessary to replenish the PSU. This is accomplished by first closing the PRIV 62 and the PFIV 212 which traps pressure behind the piston. (The PFIV 212 eliminates four check valves and permits ease of service bleeding the brakes.) The ball screw and PSU piston 45 are retracted. This forces fluid behind the PSU piston 45 to flow to the front of the PSU piston 45 via the second check valve 58. Pressure on both sides of the PSU piston 45 is maintained during replenishment since both sides of the PSU piston 45 displace equal volumes as the PSU piston 45 travels.

Figure 10:
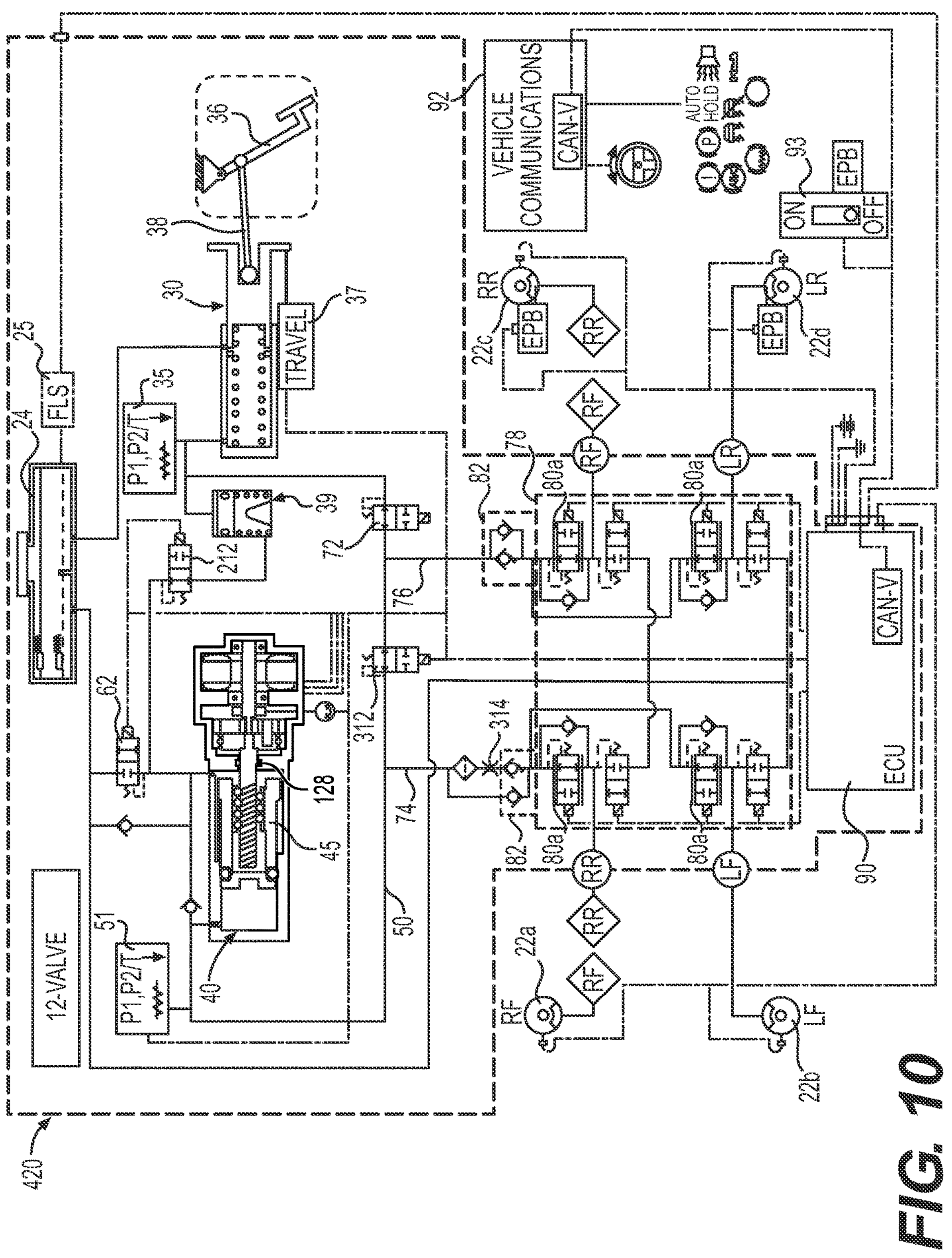
FIG. 10 shows a schematic diagram of a 12-valve brake-by-wire system, in accordance with an aspect of the present disclosure.

FIG. 10 shows a schematic diagram of a 12-valve brake-by-wire system, in accordance with an aspect of the present disclosure. The 12-valve brake-by-wire system may be similar or identical to the 11-valve system of FIG. 9, with a few changes discussed herein. The 12-valve brake-by-wire system includes a brake circuit isolation valve (BCIV) 312, which may be a normally-open solenoid valve, selectively coupling the PSU fluid passageway 50 and the second brake circuit 76.

FIG. 10 includes a one-box, 12-valve BbW device 420, as an integrated assembly. The 12-valve system is so-named because of its inclusion of twelve actuated valves including the PRIV 62, the MCIV 72, the PFIV 212, brake circuit isolation valve 312, plus the eight solenoid valves in the control valve manifold 78. The one-box, 12-valve BbW device 420 of FIG. 10 also includes a Brake Circuit Balance Orifice (BCBO) 314 configured to restrict fluid flow through only the first brake circuit 74 to two of the wheel brakes 22*a*, 22*b*, 22*c*, 22*d*. The BCBO 314 is connected in line with the supply-side check valve of the dual check valves 82 to regulate fluid flow from the PSU fluid passageway 50 to the corresponding ones of the wheel brakes 22*a*, 22*b*, 22*c*, 22*d*.

The 12-valve design shown in FIG. 10 includes the PSU assembly 40 and the master cylinder 30. When in brake-by-wire mode and the driver applies the brake pedal, the MCIV 72 is closed, and the PRIV 62 is opened. Fluid from the master cylinder 30 is directed to the PFE 39 to simulate normal brake pedal force and travel. That same travel information is sent to the ECU 90 which subsequently applies the appropriate current to the PSU motor 42 to rotate the ball screw and mechanically displace the PSU piston. This causes the fluid to travel through the BCIV 312, the BCBO 314, the dual check valves 82, through the ABS apply valves 80*a*, and finally reaching the wheel brakes 22*a*, 22*b*, 22*c*, 22*d* to apply pressure and slow the vehicle. The BCBO 314 may equalize flow between two diagonal circuits in a diagonal split system.

Since this is an "open" system, meaning the fluid released from the wheel brakes 22*a*, 22*b*, 22*c*, 22*d* in an ABS stop is not captured but flows back to the fluid reservoir 24 at atmospheric pressure, it is necessary to replenish the PSU assembly 40. This is accomplished by first closing the PRIV 62 and the PFIV 212 which traps pressure behind the PSU piston 45. (The PFIV 212 eliminates four check valves and permits ease of service bleeding the brakes.) The ball screw and PSU piston 45 are retracted. This forces fluid behind the PSU piston 45 to flow to the front of the PSU piston 45 via the second check valve 58. Pressure on both sides of the PSU piston 45 is maintained during replenishment since both sides of the PSU piston 45 displace equal volumes as the PSU piston 45 travels.

Figure 11:
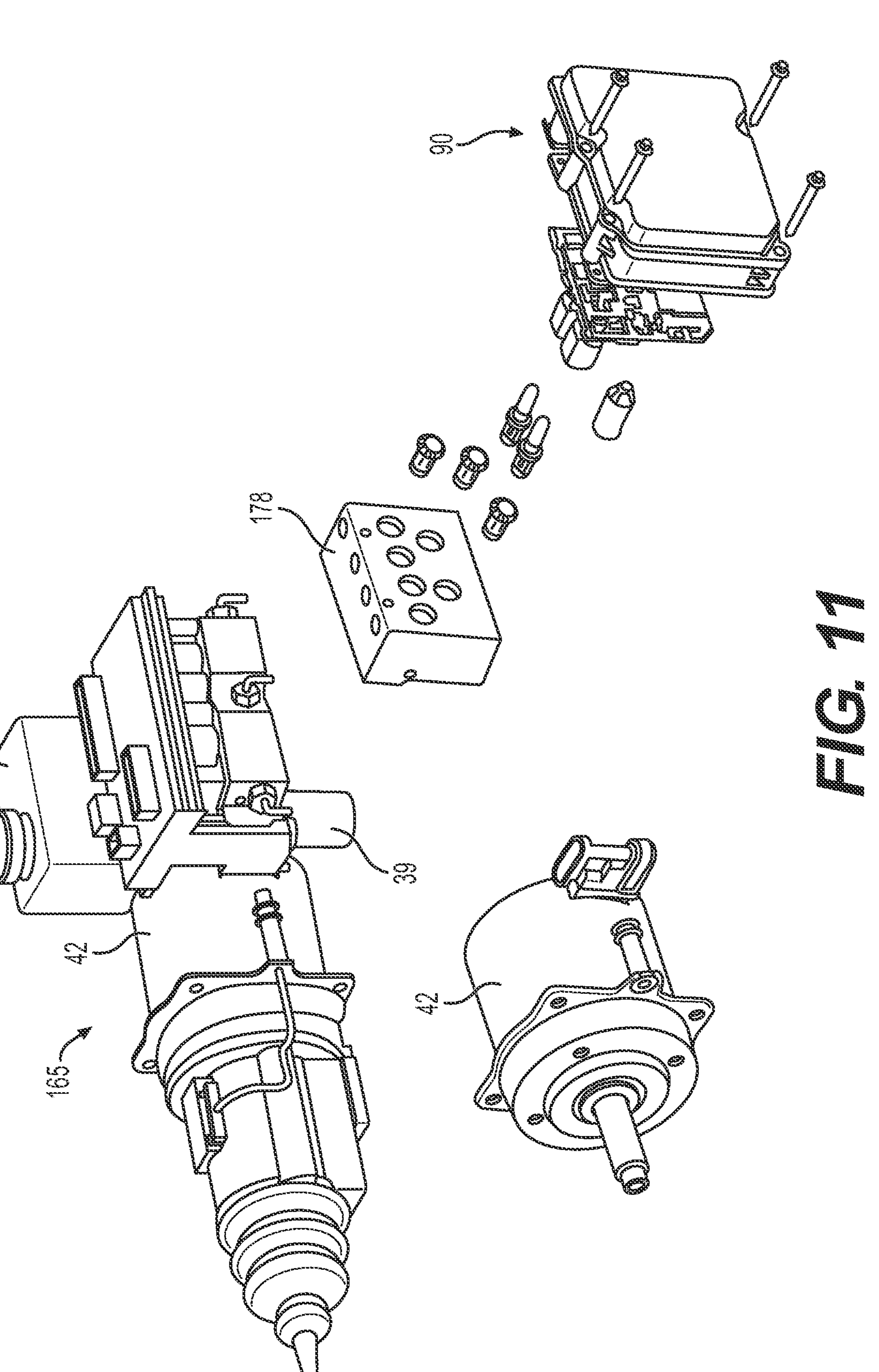
FIG. 11 shows a one-box brake-by-wire device having an axial configuration, with the PSU axially aligned with the master cylinder.
Figure 12:
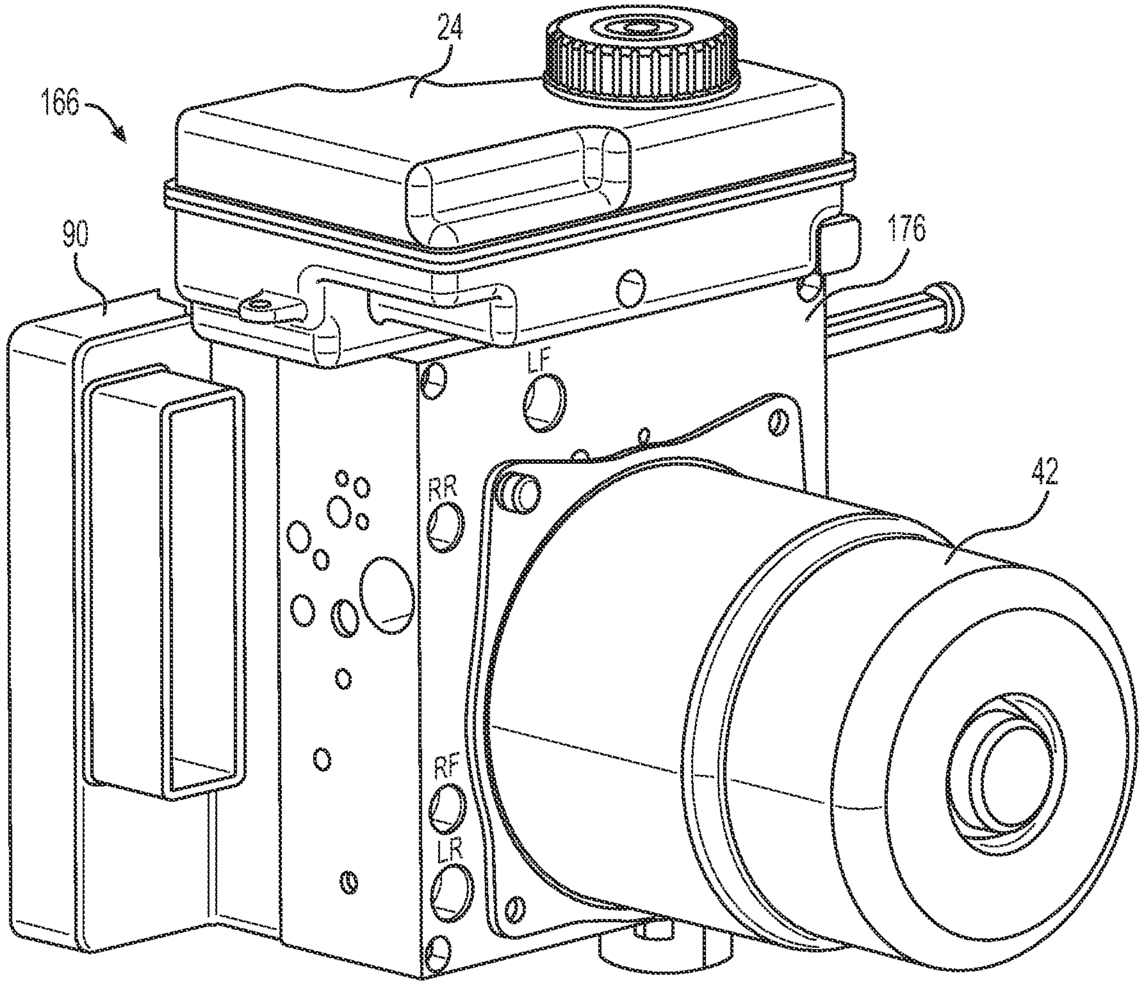
FIG. 12 shows a one-box brake-by-wire device with a transverse motor configuration.
Figure 13:
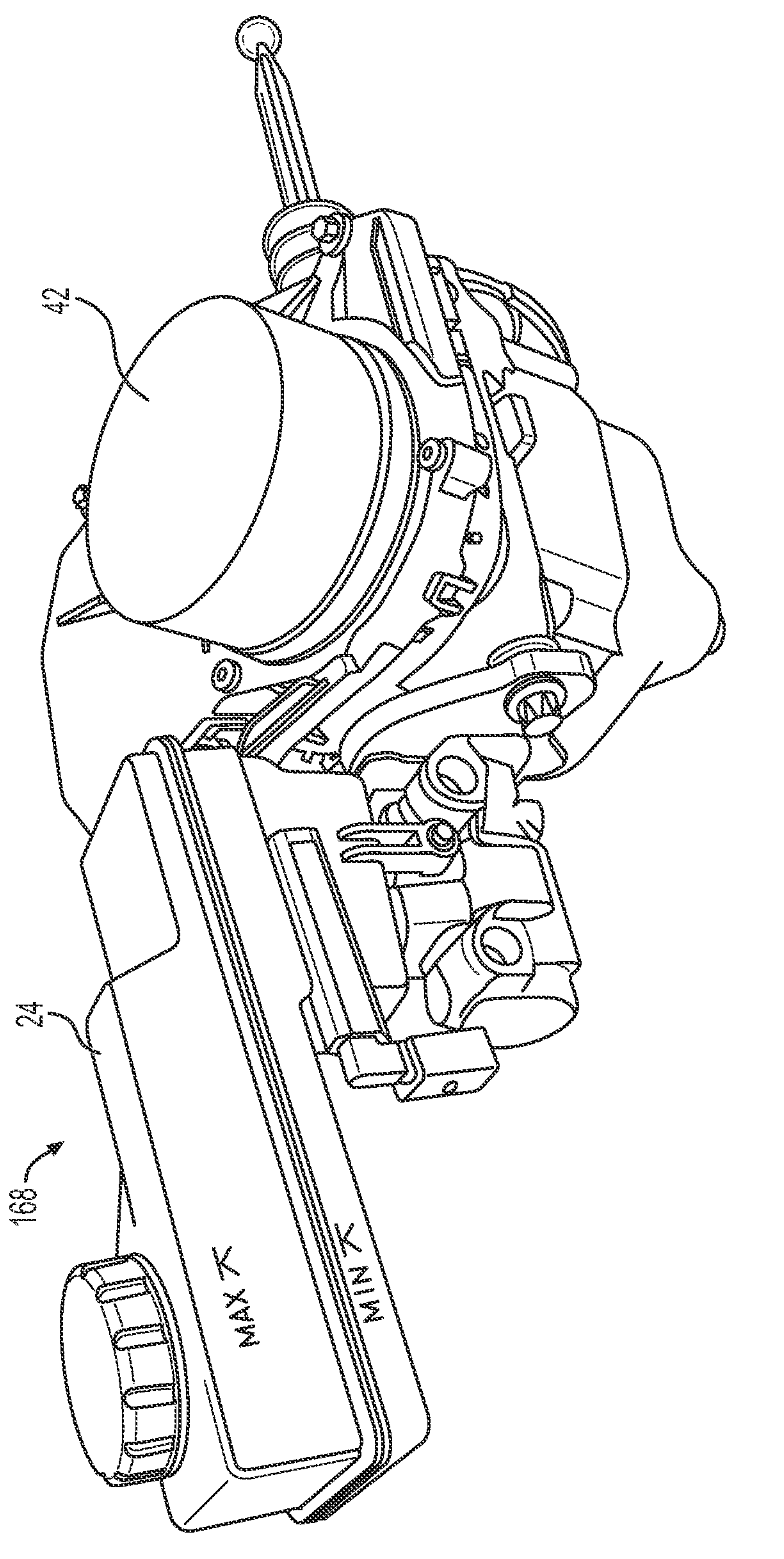
FIG. 13 shows a one-box brake-by-wire device with a motor-up configuration.
Figure 14:
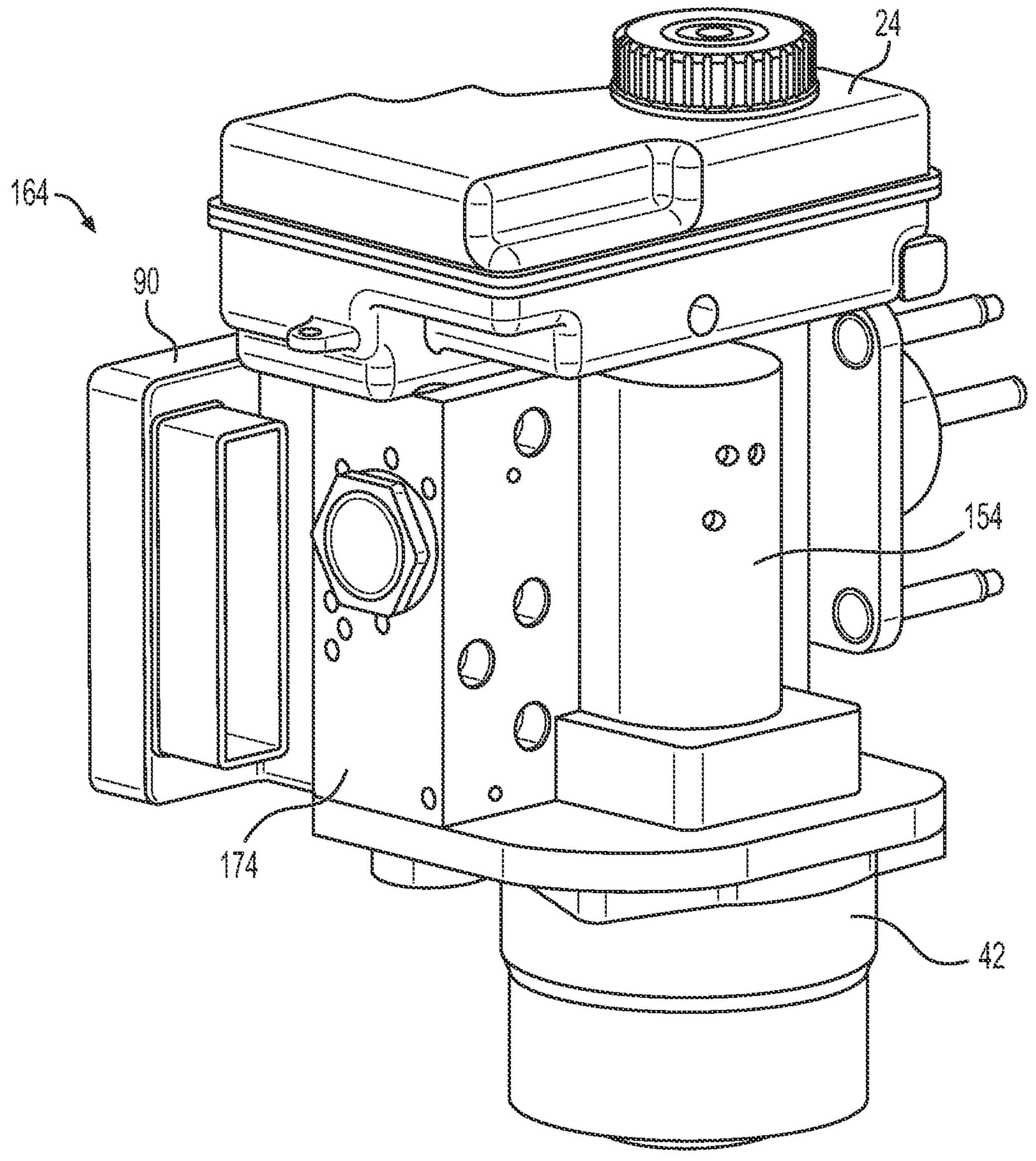
FIG. 14 shows a one-box brake-by-wire device with a motor-down configuration.

FIG. 11 shows a fifth one-box brake-by-wire device 165 having an axial configuration, with the electric motor 42 and the piston bore 102 of the PSU assembly 40 axially aligned with the master cylinder 30, and with a fifth HCU 178 located aside the axial arrangement of the PSU and the master cylinder 30. FIG. 12 shows the fourth one-box brake-by-wire device 166 of FIG. 7 in an assembled condition with the fluid reservoir 24 attached to the top, and the ECU 90 attached on a side face of the fourth HCU body 176 opposite from the electric motor 42. FIG. 13 shows a sixth one-box brake-by-wire device 168 with a motor-up configuration. FIG. 14 shows the third one-box brake-by-wire device 164 of FIG. 6C with a motor-down configuration and in an assembled condition with the fluid reservoir 24 attached to the top, and the ECU 90 attached on a side face of the third HCU body 174 opposite from the electric motor 42.

As shown on FIG. 14, the third one-box brake-by-wire device 164 includes the fluid reservoir 24 mounted on the top surface of the third HCU body 174 and the electric motor 42 of the PSU assembly 40 is mounted to the bottom surface of the third HCU body 174, opposite from the fluid reservoir 24. Also, the third PSU assembly 154, which includes the PSU housing 100 defining the piston bore 102, does not extend beyond the top surface of the third HCU body 174.

The one-box BbW devices 220, 320, 420 of the present disclosure may be packaged in any configuration. For example, any of the one-box BbW devices 220, 320, 420 may have an axial configuration, with the PSU assembly 40 axially aligned with the master cylinder 30, as shown in FIG. 11. Additionally or alternatively, any of the one-box BbW devices 220, 320, 420 may have a transverse motor configuration, with the electric motor 42 having a motor shaft that extends horizontally and transverse to the master cylinder 30, as shown in FIG. 12. Additionally or alternatively, any of the one-box BbW devices 220, 320, 420 may have a motor-up configuration, with the electric motor 42 located above the master cylinder 30, as shown in FIG. 13. Additionally or alternatively, any of the one-box BbW devices 220, 320, 420 may have a motor-down configuration, as shown in FIG. 14.

According to an aspect of the disclosure, a first brake system for motor vehicles is provided. The first brake system may include the 10-valve brake-by-wire system of the present disclosure. The first brake system can be activated by a vehicle driver in a normal brake-by-wire operating mode, via electrical actuation. The first brake system can also be operated by the same driver in at least one fallback operating mode in which one or more of the wheel brakes 22*a*, 22*b*, 22*c*, 22*d* is directly operable in response to application of the brake pedal 36, and without any electrical power.

According to an aspect of the disclosure, the first brake system may include: a brake pedal for actuating a brake master cylinder having a housing and a single piston and which defines a single pressure chamber which is subsequently connected to the wheel brakes 22*a*, 22*b*, 22*c*, 22*d*, wherein an actuating force exerted by the brake pedal is exerted on the single piston upon actuation of the brake system by the vehicle driver and the piston is positioned in a starting position by a return spring when the brake pedal is not actuated;

According to an aspect of the disclosure, the first brake system may further include: a pressure medium reservoir for a pressure medium which is exposed to atmospheric pressure and has a reservoir chamber associated with the pressure chamber.

According to an aspect of the disclosure, the first brake system may further include: a travel detection device which detects the actuation travel of the brake pedal or at least the piston connected to the brake pedal; a pedal feel emulator which conveys a desired haptic brake pedal feel to the vehicle driver in the brake-by-wire mode, being connected hydraulically directly to the master cylinder pressure chamber;

According to an aspect of the disclosure, the first brake system may further include: an electrically controllable pressure supply unit which delivers a brake system pressure and consists of a floating piston sealed to the main housing bore and containing at least one anti-rotation feature that connects with at least one groove in the main housing bore which prevents piston rotation but permits piston translation.

According to an aspect of the disclosure, the first brake system may further include: the pressure supply unit piston displaced by an independently actuated ball screw nut of a ball screw assembly on one end to supply brake system pressure whereas the ball screw spindle of said ball screw assembly is permanently attached to the inner race of a ball bearing assembly whose outer race is permanently attached to a stepped bore in the main housing and whose inner race permits rotation but prevents translation of said ball screw spindle.

According to an aspect of the disclosure, the first brake system may further include: said ball screw assembly spindle is also sealed to the main housing in a corresponding bore containing a radial lip seal thus permitting brake fluid entrance to the ball screw assembly nut and roller balls, but preventing brake fluid entrance to the area containing the bearing inner race, According to an aspect of the disclosure, the first brake system may further include: said ball bearing inner race containing at least one pin on which is rotatably attached a planet gear of a planetary gearset assembly whose outer ring gear is permanently attached to a stepped bore of the main bore and whose sun gear is permanently attached to the output shaft of an electric motor. The motor may be a brushless motor.

According to an aspect of the disclosure, the first brake system may further include: a normally open valve for isolating the master cylinder from the brake circuit located between the master cylinder outlet port and the wheel brakes.

According to an aspect of the disclosure, the first brake system may further include: a normally closed valve for isolating the motor side of the electrically controllable pressure source to the reservoir.

According to an aspect of the disclosure, the first brake system may further include: a series of check valves that allow flow from the pedal feel emulator to the normally closed valve above, but prohibit flow in the opposite direction.

According to an aspect of the disclosure, the first brake system may further include: a forward flow and reverse flow check valve in parallel to each other and located between the pressure supply unit and two of the wheel brakes with a second forward flow and reverse flow check valve in parallel to each other and located between the pressure supply unit and the remaining pair of wheel brakes.

According to an aspect of the disclosure, the first brake system may further include: an inlet valve and outlet valve for each of the wheel brakes for setting wheel-individual brake pressures which are derived from signals generated by the electronic control unit where the inlet valves transmit fluid to the wheel brakes in an unactivated state, and limiting or preventing a build-up of wheel pressure in an activated state and the outlet valves preventing an outflow of the pressure medium from the wheel brakes to the reservoir in an unactivated state and permitting and controlling the outflow in an activated state, the inlet valves being closed, so that a reduction in wheel brake pressure takes place.

According to an aspect of the disclosure, a second brake system for motor vehicles is provided. The second brake system may include the 11-valve brake-by-wire system of the present disclosure. The second brake system can be activated by a vehicle driver in a normal brake-by-wire operating mode, via electrical actuation. The second brake system can also be operated by the same driver in at least one fallback operating mode in which one or more of the wheel brakes 22*a*, 22*b*, 22*c*, 22*d* is directly operable in response to application of the brake pedal 36, and without any electrical power.

According to an aspect of the disclosure, the second brake system may include: a brake pedal for actuating a brake master cylinder having a housing and a single piston and which defines a single pressure chamber which is subsequently connected to the wheel brakes, wherein an actuating force exerted by the brake pedal is exerted on the single piston upon actuation of the brake system by the vehicle driver and the piston is positioned in a starting position by a return spring when the brake pedal is not actuated.

According to an aspect of the disclosure, the second brake system may also include: a pressure medium reservoir for a pressure medium which is exposed to atmospheric pressure and has a reservoir chamber associated with the pressure chamber.

According to an aspect of the disclosure, the second brake system may also include: a travel detection device which detects the actuation travel of the brake pedal or at least the piston connected to the brake pedal.

According to an aspect of the disclosure, the second brake system may also include: a pedal feel emulator which conveys a desired haptic brake pedal feel to the vehicle driver in the brake-by-wire mode, being connected hydraulically directly to the master cylinder pressure chamber.

According to an aspect of the disclosure, the second brake system may also include: an electrically controllable pressure supply unit which delivers a brake system pressure and consists of a floating piston sealed to the main housing bore and containing at least one anti-rotation feature that connects with at least one groove in the main housing bore which prevents piston rotation but permits piston translation.

According to an aspect of the disclosure, the second brake system may also include: said pressure supply unit piston displaced by an independently actuated ball screw nut of a ball screw assembly on one end to supply brake system pressure whereas the ball screw spindle of said ball screw assembly is permanently attached to the inner race of a ball bearing assembly whose outer race is permanently attached to a stepped bore in the main housing and whose inner race permits rotation but prevents translation of said ball screw spindle.

According to an aspect of the disclosure, the second brake system may also include: said ball screw assembly spindle is also sealed to the main housing in a corresponding bore containing a radial lip seal thus permitting brake fluid entrance to the ball screw assembly nut and roller balls, but preventing brake fluid entrance to the area containing the bearing inner race.

According to an aspect of the disclosure, the second brake system may also include: said ball bearing inner race containing at least one pin on which is rotatably attached a planet gear of a planetary gearset assembly whose outer ring gear is permanently attached to a stepped bore of the main bore and whose sun gear is permanently attached to the output shaft of an electric motor. The motor may be a brushless motor.

According to an aspect of the disclosure, the second brake system may also include: a normally open valve for isolating the master cylinder from the brake circuit located between the master cylinder outlet port and the wheel brakes.

According to an aspect of the disclosure, the second brake system may also include: a normally closed valve for isolating the motor side of the electrically controllable pressure source to the reservoir.

According to an aspect of the disclosure, the second brake system may also include: a normally open valve for isolating the pedal feel emulator from the pressure supply unit during a regeneration cycle.

According to an aspect of the disclosure, the second brake system may also include: a forward flow and reverse flow check valve in parallel to each other and located between the pressure supply unit and two of the wheel brakes with a second forward flow and reverse flow check valve in parallel to each other and located between the pressure supply unit and the remaining pair of wheel brakes.

According to an aspect of the disclosure, the second brake system may also include: an inlet valve and outlet valve for each of the wheel brakes for setting wheel-individual brake pressures which are derived from signals generated by the electronic control unit where the inlet valves transmit fluid to the wheel brakes in an unactivated state and limiting or preventing a build-up of wheel pressure in an activated state and the outlet valves preventing an outflow of the pressure medium from the wheel brakes to the reservoir in an unactivated state and permitting and controlling the outflow in an activated state, the inlet valves being closed, so that a reduction in wheel brake pressure takes place.

According to an aspect of the disclosure, a third brake system for motor vehicles is provided. The third brake system may include the 12-valve brake-by-wire system of the present disclosure. The third brake system can be activated by a vehicle driver in a normal brake-by-wire operating mode, via electrical actuation. The third brake system can also be operated by the same driver in at least one fallback operating mode in which only operation of the brake system by the vehicle driver is possible.

According to an aspect of the disclosure, the third brake system may include: a brake pedal for actuating a brake master cylinder having a housing and a single piston and which defines a single pressure chamber which is subsequently connected to the wheel brakes, wherein an actuating force exerted by the brake pedal is exerted on the single piston upon actuation of the brake system by the vehicle driver and the piston is positioned in a starting position by a return spring when the brake pedal is not actuated.

According to an aspect of the disclosure, the third brake system may also include: a pressure medium reservoir for a pressure medium which is exposed to atmospheric pressure and has a reservoir chamber associated with the pressure chamber.

According to an aspect of the disclosure, the third brake system may also include: a travel detection device which detects the actuation travel of the brake pedal or at least the piston connected to the brake pedal.

According to an aspect of the disclosure, the third brake system may also include: a pedal feel emulator which conveys a desired haptic brake pedal feel to the vehicle driver in the brake-by-wire mode, being connected hydraulically directly to the master cylinder pressure chamber.

According to an aspect of the disclosure, the third brake system may also include: an electrically controllable pressure supply unit which delivers a brake system pressure and consists of a floating piston sealed to the main housing bore and containing at least one anti-rotation feature that connects with at least one groove in the main housing bore which prevents piston rotation but permits piston translation.

According to an aspect of the disclosure, the third brake system may also include: said pressure supply unit piston displaced by an independently actuated ball screw nut of a ball screw assembly on one end to supply brake system pressure whereas the ball screw spindle of said ball screw assembly is permanently attached to the inner race of a ball bearing assembly whose outer race is permanently attached to a stepped bore in the main housing and whose inner race permits rotation but prevents translation of said ball screw spindle.

According to an aspect of the disclosure, the third brake system may also include: said ball screw assembly spindle is also sealed to the main housing in a corresponding bore containing a radial lip seal thus permitting brake fluid entrance to the ball screw assembly nut and roller balls, but preventing brake fluid entrance to the area containing the bearing inner race.

According to an aspect of the disclosure, the third brake system may also include: said ball bearing inner race containing at least one pin on which is rotatably attached a planet gear of a planetary gearset assembly whose outer ring gear is permanently attached to a stepped bore of the main bore and whose sun gear is permanently attached to the output shaft of an electric motor. The motor may be a brushless motor.

According to an aspect of the disclosure, the third brake system may also include: a normally open valve for isolating the master cylinder from the brake circuit located between the master cylinder outlet port and the wheel brakes.

According to an aspect of the disclosure, the third brake system may also include: a normally open valve for dividing the brake circuits in two equivalent parts.

According to an aspect of the disclosure, the third brake system may also include: a filtered orifice assembly to provide balanced flow to one of the divided circuits for a diagonal split circuit.

According to an aspect of the disclosure, the third brake system may also include: a forward flow and reverse flow check valve in parallel to each other and located between the pressure supply unit and two of the wheel brakes with a second forward flow and reverse flow check valve in parallel to each other and located between the pressure supply unit and the remaining pair of wheel brakes.

According to an aspect of the disclosure, the third brake system may also include: an inlet valve and outlet valve for each of the wheel brakes for setting wheel-individual brake pressures which are derived from signals generated by the electronic control unit where the inlet valves transmit fluid to the wheel brakes in an unactivated state and limiting or preventing a build-up of wheel pressure in an activated state and the outlet valves preventing an outflow of the pressure medium from the wheel brakes to the reservoir in an unactivated state and permitting and controlling the outflow in an activated state, the inlet valves being closed, so that a reduction in wheel brake pressure takes place.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electro-hydraulic brake system comprising:

a single-circuit master cylinder (MC) fluidly coupled to a first MC fluid passageway and configured to supply fluid into the first MC fluid passageway in response to pressing force on a brake pedal coupled thereto;

a pressure supply unit (PSU) assembly including an electric motor coupled to a ball screw actuator, a PSU housing defining a piston bore having a terminal end opposite the electric motor, and a PSU piston disposed within the piston bore and movable by the ball screw actuator through the piston bore and dividing the piston bore into a first chamber and a second chamber, with each of the first chamber and the second chamber containing a hydraulic fluid; and wherein the ball screw actuator includes an actuator nut assembly having a plurality of ball bearings each disposed within the piston bore and submerged in the hydraulic fluid.

2. The electro-hydraulic brake system of claim 1, wherein the PSU piston has a cup shape, and wherein the actuator nut and the plurality of ball bearings are each disposed within the cup shape of the PSU piston.

3. The electro-hydraulic brake system of claim 1, wherein the PSU assembly further comprises: a spindle driven by the electric motor and extending through a ring seal to prevent fluid from leaking out of the piston bore.

4. The electro-hydraulic brake system of claim 1, further comprising:

a PSU fluid passageway providing fluid communication from the first chamber of the PSU assembly to at least one wheel brake;

a replenishing fluid passageway in fluid communication with the second chamber of the PSU assembly; and a check valve configured to allow fluid flow from the replenishing fluid passageway to the PSU fluid passageway while blocking fluid flow in an opposite direction.

5. The electro-hydraulic brake system of claim 1, further comprising:

at least one brake circuit configured to transmit fluid from the PSU assembly to at least one wheel brake;

a control valve manifold including at least one of an apply valve and a release valve for controlling fluid flow between the at least one brake circuit and the at least one wheel brake;

wherein the pressure supply unit assembly includes at least one PSU port configured to discharge fluid therefrom; and wherein the at least one PSU port is in fluid communication with the control valve manifold via the at least one brake circuit and without any actuated valves therebetween.

6. The electro-hydraulic brake system of claim 1, further comprising:

a pedal feel emulator (PFE) including a PFE piston movable through a PFE bore and separating an upper chamber from a lower chamber;

wherein the lower chamber of the PFE is fluidly coupled to the second chamber of the PSU assembly to convey fluid from the lower chamber of the PFE to the second chamber of the PSU assembly in response to a compression of the PFE; and wherein the first MC fluid passageway is fluidly coupled to the upper chamber of the PFE to provide a fluid path from the master cylinder into the upper chamber of the PFE.

7. The electro-hydraulic brake system of claim 6, further comprising:

a fluid reservoir holding a hydraulic fluid and supplying the hydraulic fluid to the master cylinder;

a return fluid passageway in direct fluid communication with the fluid reservoir, an intermediate fluid passageway in fluid communication with each of the second chamber of the piston bore and the lower chamber of the PFE; and a PSU reservoir isolation valve selectively controlling fluid communication between the return fluid passageway and the intermediate fluid passageway.

8. The electro-hydraulic brake system of claim 7, further comprising a check valve disposed between the second chamber of the piston bore and the intermediate fluid passageway and configured to allow fluid flow from the second chamber of the piston bore to the intermediate fluid passageway while blocking fluid flow in an opposite direction.

9. The electro-hydraulic brake system of claim 7, further comprising:

a check valve disposed between the lower chamber of the PFE and the intermediate fluid passageway and configured to allow fluid flow from the lower chamber of the PFE to the intermediate fluid passageway while blocking fluid flow in an opposite direction.

10. The electro-hydraulic brake system of claim 7, further comprising a PFE isolation valve selectively controlling fluid communication between the lower chamber of the PFE and the intermediate fluid passageway.

11. The electro-hydraulic brake system of claim 1, further comprising:

a first brake circuit and a second brake circuit, each configured to transmit fluid from the PSU assembly to at least one corresponding wheel brake;

a PSU fluid passageway providing fluid communication from the PSU assembly to the first brake circuit; and a brake circuit isolation valve selectively controlling fluid communication between the PSU fluid passageway and the second brake circuit.

12. The electro-hydraulic brake system of claim 1, further comprising:

a PSU fluid passageway configured to transmit fluid from the PSU assembly to at least one wheel brake;

a control valve manifold including at least one of an apply valve and a release valve for controlling fluid flow between the PSU fluid passageway and the at least one wheel brake; and a bi-directional check valve disposed between PSU fluid passageway and the control valve manifold and configured to allow fluid flow in either of two opposite directions therebetween only when a differential pressure thereacross is above a predetermined amount.

13. The electro-hydraulic brake system of claim 1, further comprising:

a first brake circuit and a second brake circuit, each configured to transmit fluid from the PSU assembly to at least one corresponding wheel brake;

a PSU fluid passageway providing fluid communication from the PSU assembly to the first brake circuit and the second brake circuit; and a brake circuit balance orifice configured to restrict a flow of fluid through only the first brake circuit.

14. The electro-hydraulic brake system of claim 1, further comprising:

a hydraulic control unit (HCU) body defining a top surface and a bottom surface opposite the top surface and including a PSU housing defining the piston bore;

a fluid reservoir mounted on the top surface of the HCU body; and wherein the electric motor of the PSU assembly is mounted to the bottom surface of the HCU body.

15. The electro-hydraulic brake system of claim 14, wherein the PSU assembly does not extend beyond the top surface of the HCU body.

16. A pressure supply unit (PSU) assembly for an electro-hydraulic brake system comprising:

an electric motor;

a ball screw actuator including a spindle coupled to the electric motor and configured to transfer rotary motion to linear motion;

a PSU housing coupled to the electric motor and defining a piston bore having a terminal end opposite the electric motor; and a PSU piston disposed within the piston bore and translatable by the ball screw actuator through the piston bore and dividing the piston bore into a first chamber and a second chamber, with each of the first chamber and the second chamber containing a hydraulic fluid, wherein the ball screw actuator includes an actuator nut assembly having a plurality of ball bearings each disposed within the second chamber of the piston bore and submerged in the hydraulic fluid.

17. The PSU assembly of claim 16, wherein the PSU piston has a cup shape, and wherein the actuator nut and the plurality of ball bearings are each disposed within the cup shape of the PSU piston.

18. The PSU assembly of claim 16, wherein the spindle extends through a ring seal to prevent fluid from leaking out of the piston bore.

19. The PSU assembly of claim 18, wherein the ring seal includes a lip seal.

20. The PSU assembly of claim 16, further comprising a gear set driven by the electric motor and configured to drive the spindle at a slower speed than a speed of the electric motor.

* * * * *